(12) United States Patent
Sakata et al.

(10) Patent No.: US 11,847,243 B2
(45) Date of Patent: Dec. 19, 2023

(54) MEMORY SYSTEM

(71) Applicant: Kioxia Corporation, Minato-ku (JP)

(72) Inventors: Akihiro Sakata, Kamakura (JP);
Tomonori Yokoyama, Kawasaki (JP);
Yifan Tang, Yokohama (JP)

(73) Assignee: Kioxia Corporation, Minato-ku (JP)

( * ) Notice: Subject to any disclaimer, the term of this patent is extended or adjusted under 35 U.S.C. 154(b) by 490 days.

(21) Appl. No.: 16/937,653

(22) Filed: Jul. 24, 2020

(65) Prior Publication Data

US 2021/0073404 A1 Mar. 11, 2021

(30) Foreign Application Priority Data

Sep. 11, 2019 (JP) .................. 2019-165396

(51) Int. Cl.
*G06F 12/14* (2006.01)
*G06F 21/62* (2013.01)
*G06F 3/06* (2006.01)

(52) U.S. Cl.
CPC .......... *G06F 21/6218* (2013.01); *G06F 3/068* (2013.01); *G06F 3/0623* (2013.01); *G06F 3/0659* (2013.01)

(58) Field of Classification Search
CPC .. G06F 21/6218; G06F 3/0623; G06F 3/0659; G06F 3/068; G06F 3/0656; G06F 21/79; G06F 21/85
USPC ......................................... 713/193, 182, 189
See application file for complete search history.

(56) References Cited

U.S. PATENT DOCUMENTS

| | | | |
|---|---|---|---|
| 2006/0161791 A1* | 7/2006 | Bennett | G06F 21/40 713/193 |
| 2013/0086394 A1* | 4/2013 | Shimmitsu | G06F 3/061 713/193 |
| 2018/0260151 A1* | 9/2018 | Hsu | G06F 3/0673 |
| 2018/0341606 A1 | 11/2018 | Bolkhovitin et al. | |
| 2019/0042148 A1 | 2/2019 | Benisty et al. | |
| 2019/0278926 A1* | 9/2019 | Guarnaccia | G06F 21/606 |
| 2019/0362081 A1* | 11/2019 | Kanno | G06F 3/0679 |
| 2019/0384939 A1* | 12/2019 | Wen | G06F 21/79 |
| 2020/0076587 A1* | 3/2020 | Furukawa | H04L 9/0897 |
| 2020/0244458 A1* | 7/2020 | Kanbe | G06F 3/0622 |
| 2020/0293676 A1* | 9/2020 | Hara | G06F 3/0679 |
| 2021/0294753 A1* | 9/2021 | Flynn | G06F 9/54 |
| 2021/0367769 A1* | 11/2021 | Medaglia | G11C 14/00 |
| 2022/0100883 A1* | 3/2022 | Leshinsky | G06F 21/602 |
| 2023/0022741 A1* | 1/2023 | Kanno | G06F 3/064 |
| 2023/0144287 A1* | 5/2023 | Flynn | H04L 67/02 711/103 |

* cited by examiner

*Primary Examiner* — Thuy N Pardo
(74) *Attorney, Agent, or Firm* — Oblon, McClelland, Maier & Neustadt, L.L.P.

(57) ABSTRACT

According to one embodiment, a memory system includes a nonvolatile memory and a controller. The controller controls the nonvolatile memory, writes data to a random access memory in a host, and reads data from the random access memory. The random access memory includes regions in first units to which the controller is accessible. The controller uses encryption keys associated with the regions, respectively, for encrypting data to be written into each of the regions and decrypting data read from each of the regions.

20 Claims, 23 Drawing Sheets

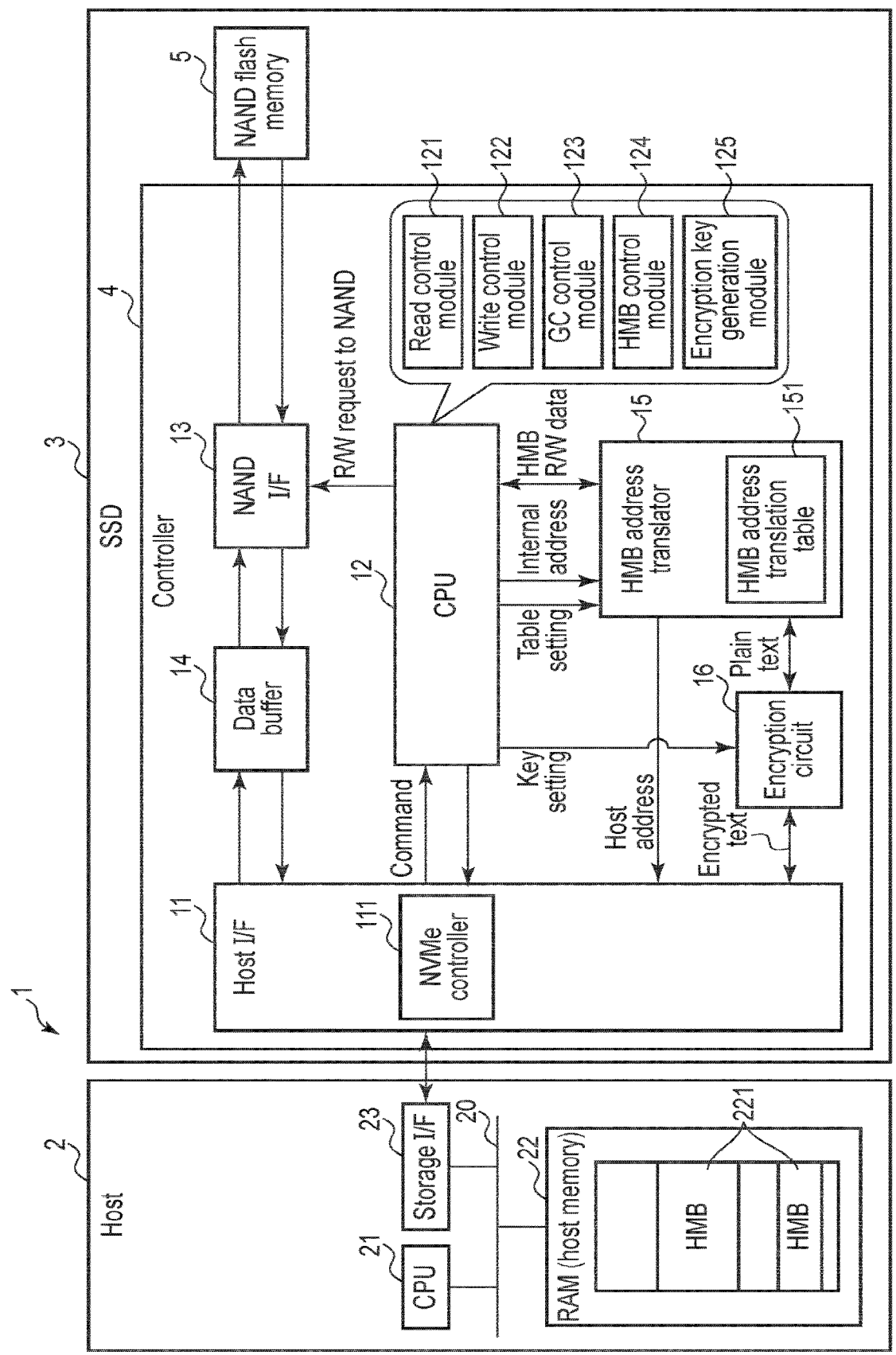
F I G. 1

| Bytes | Description |
|---|---|
| 15:0 | Host Memory Buffer Descriptor Entry 0 |
| 31:16 | Host Memory Buffer Descriptor Entry 1 |
| 47:32 | Host Memory Buffer Descriptor Entry 2 |
| 63:48 | Host Memory Buffer Descriptor Entry 3 |
| ... | ... |
| 16*n+15:16*n | Host Memory Buffer Descriptor Entry n |

F I G. 2

| Bit | Description |
|---|---|
| 127:96 | Reserved |
| 95:64 | Buffer size: Indicates the number of contiguous memory page size (MPS) units for Descriptor |
| 63:00 | Buffer address: Indicates the host memory address for Descriptor aligned to the memory page size. The lower bits [n:0] of this field indicating the offset within the memory page are 0h. If the memory page size is 4KB, then bits [11:00] are zero; if the memory page size is 8KB, then bits [12:00] are zero. |

F I G. 3

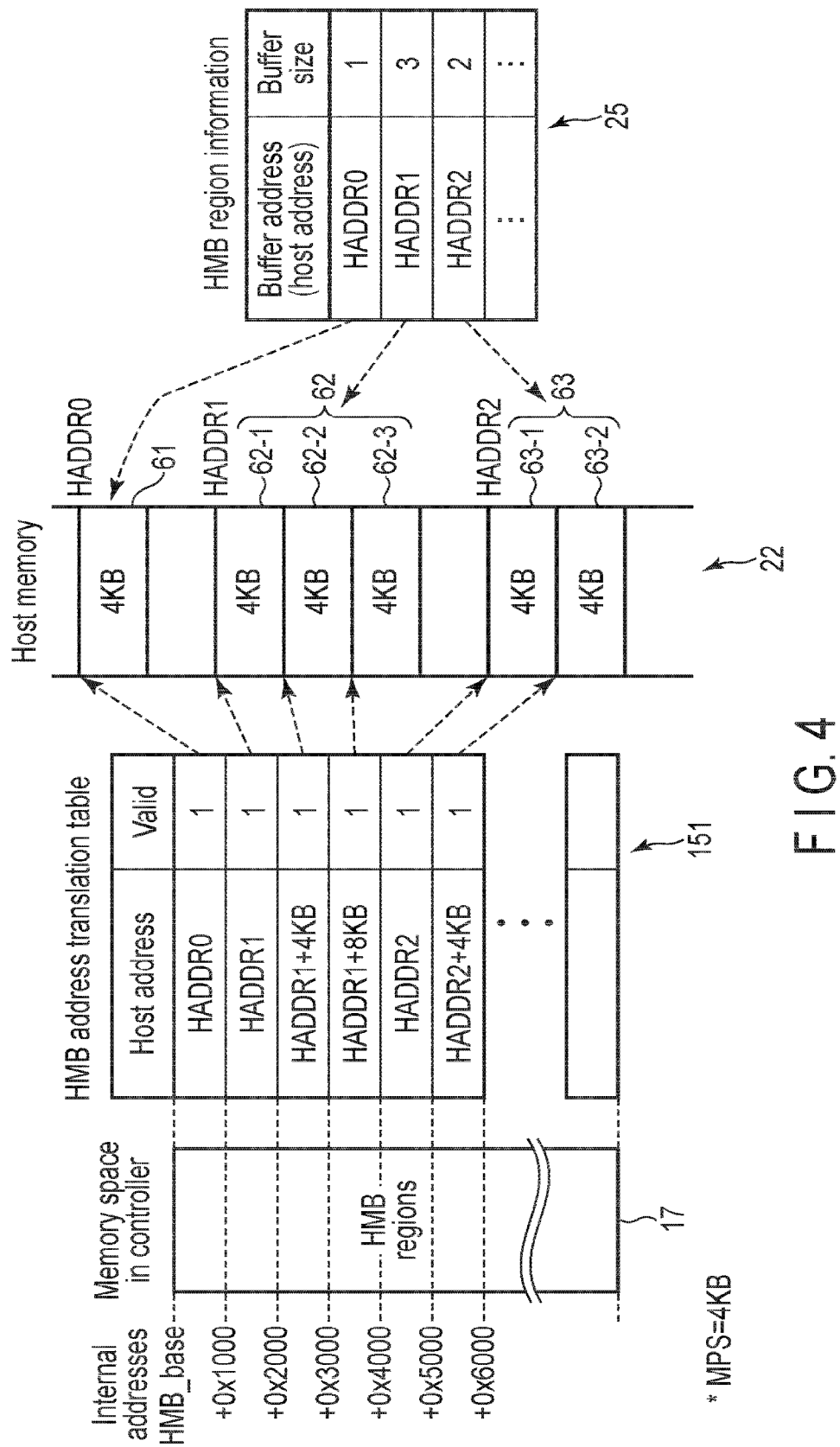
F I G. 4

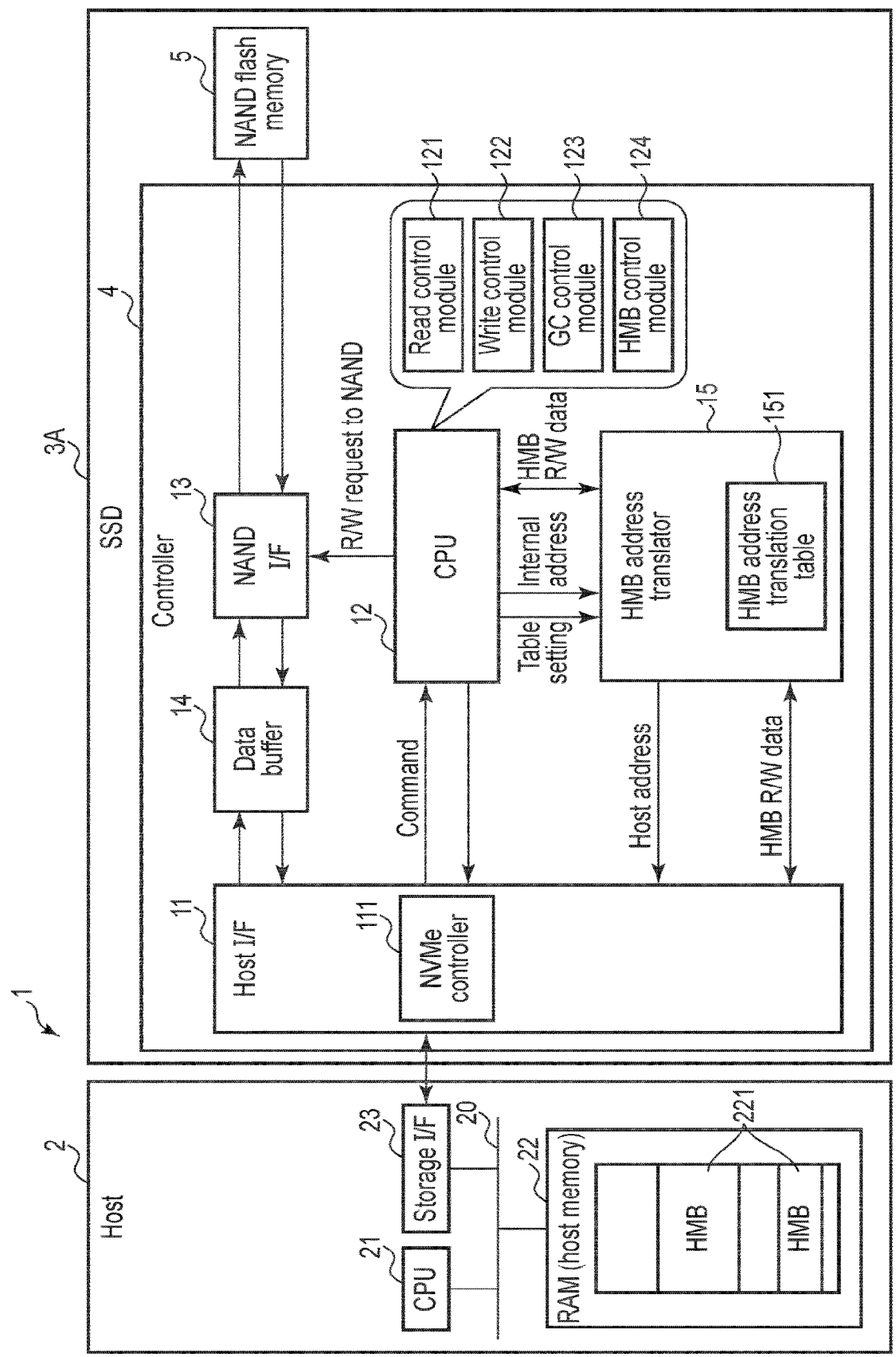
F I G. 5

| Host address | Valid |
|---|---|
| HADDR0 | 1 |
| HADDR1 | 1 |
| HADDRn | 1 |
| HADDR1+8KB | 1 |
| HADDR2 | 1 |
| HADDR2+4KB | 1 |

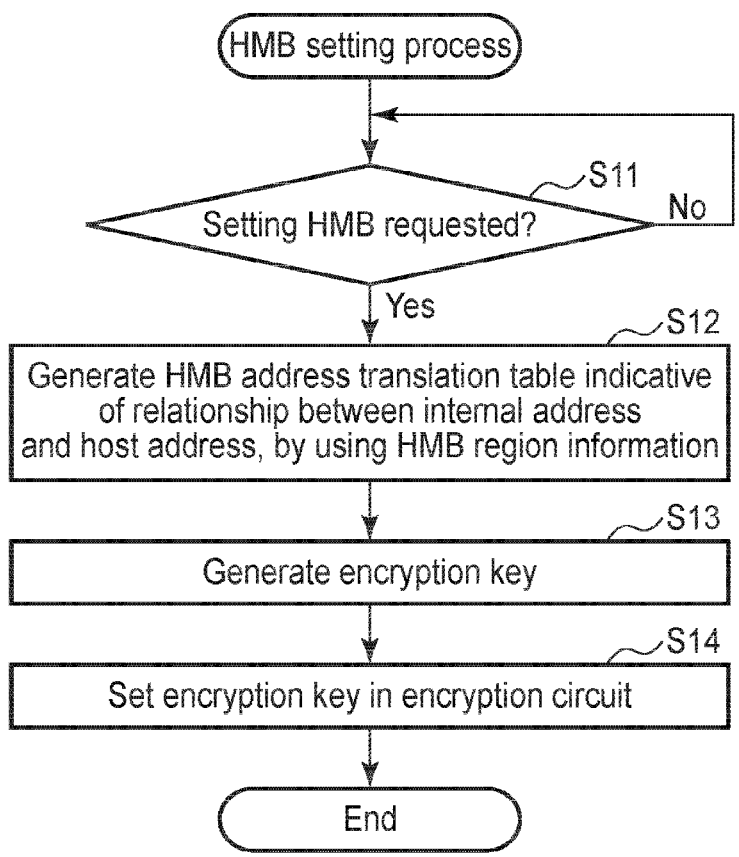
F I G. 9

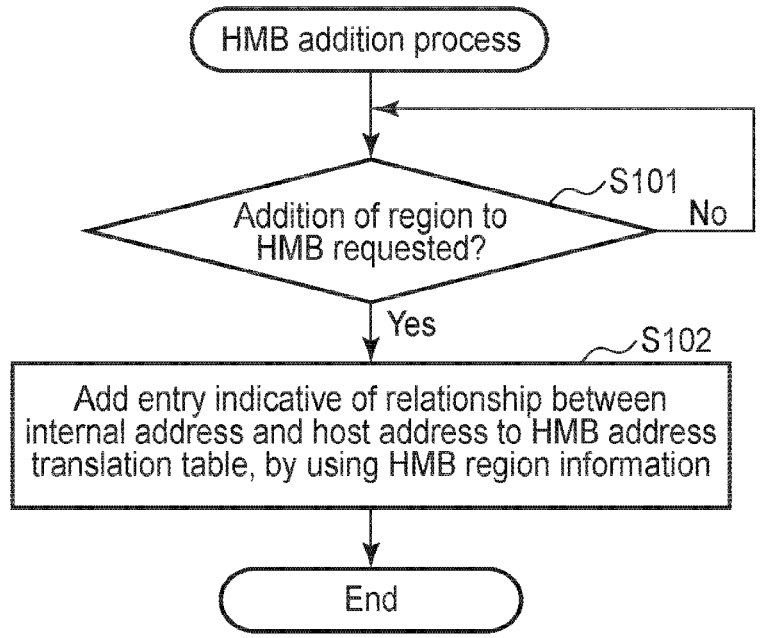
F I G. 10
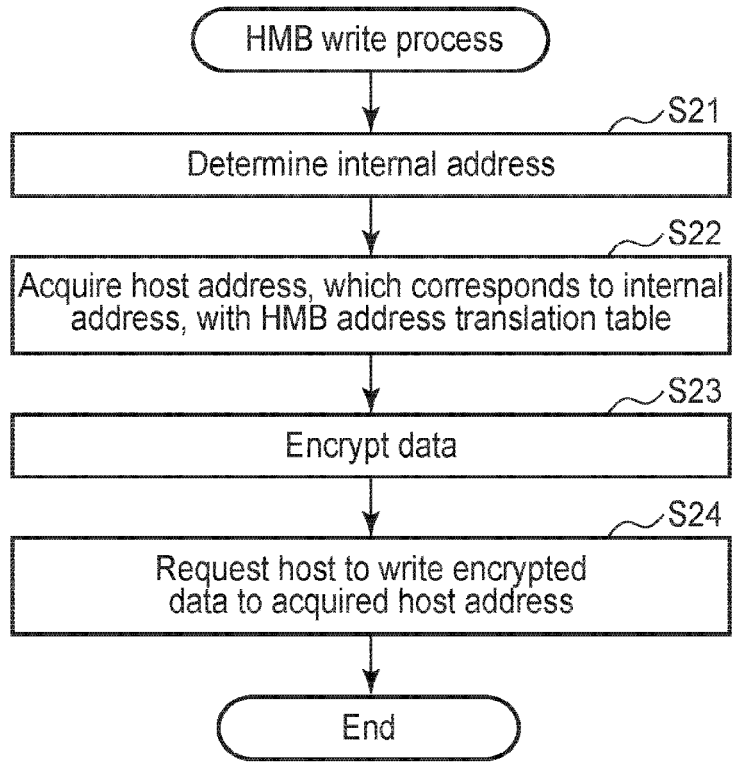
F I G. 11

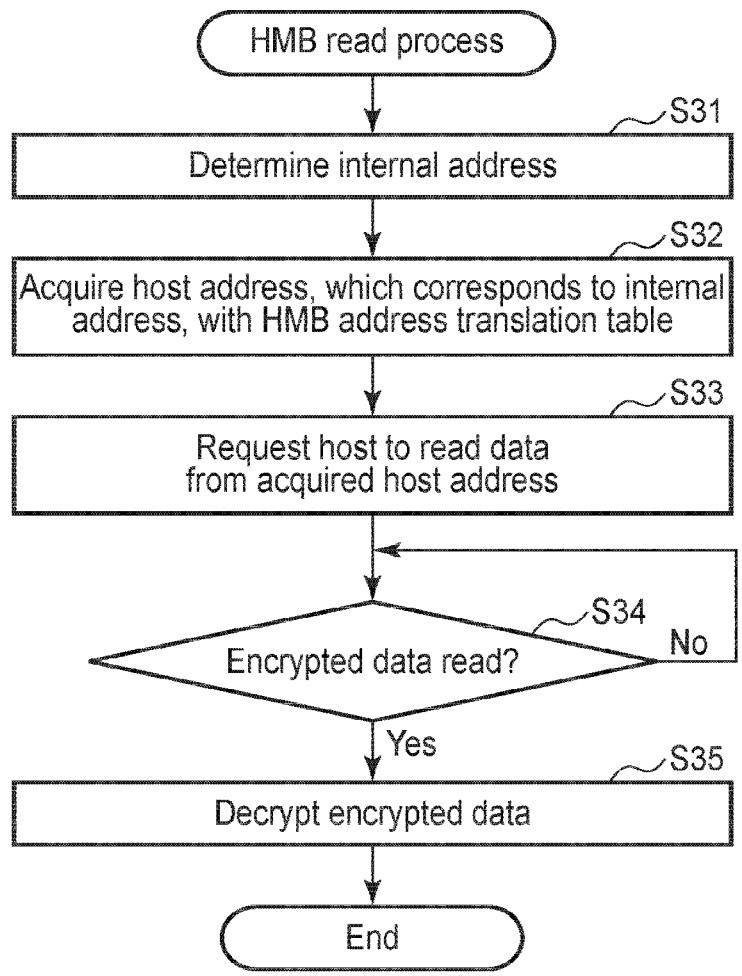
F I G. 12

| Host address | Encryption key | Valid |
|---|---|---|
| HADDR0 | keyA | 1 |
| HADDR1 | keyB | 1 |
| HADDRn | keyC | 1 |
| HADDR1+8KB | keyD | 1 |
| HADDR2 | keyE | 1 |
| HADDR2+4KB | keyF | 1 |
F I G. 16
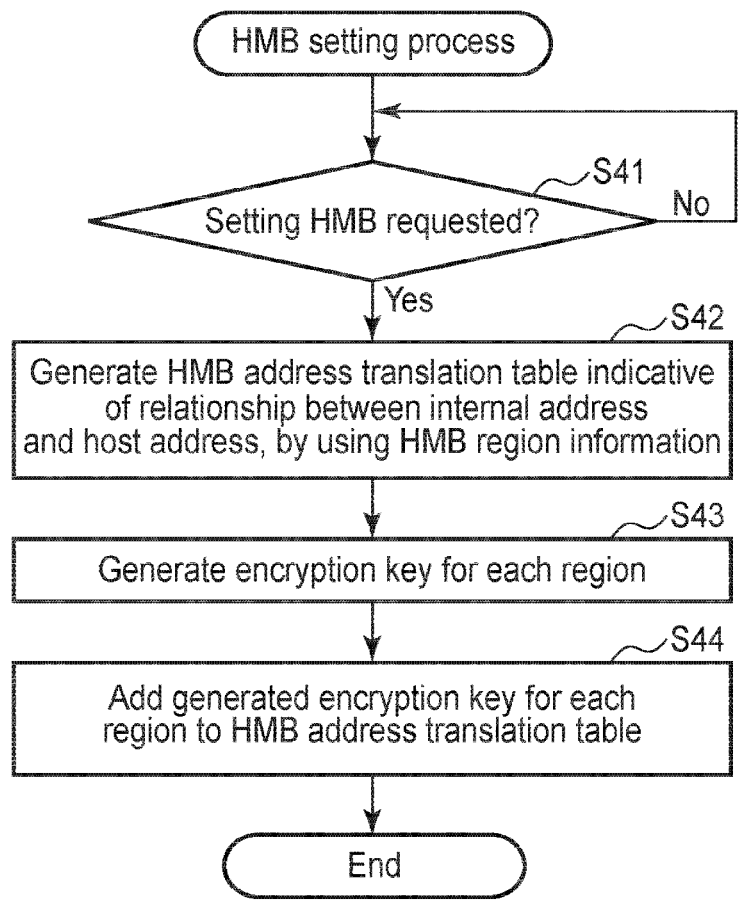
F I G. 17

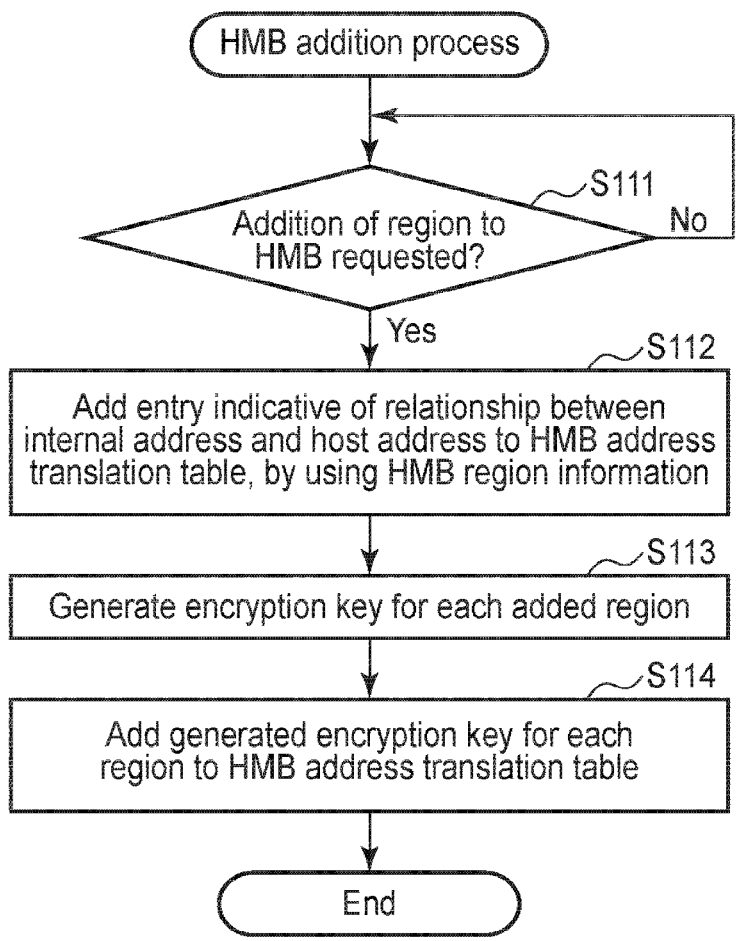
F I G. 18

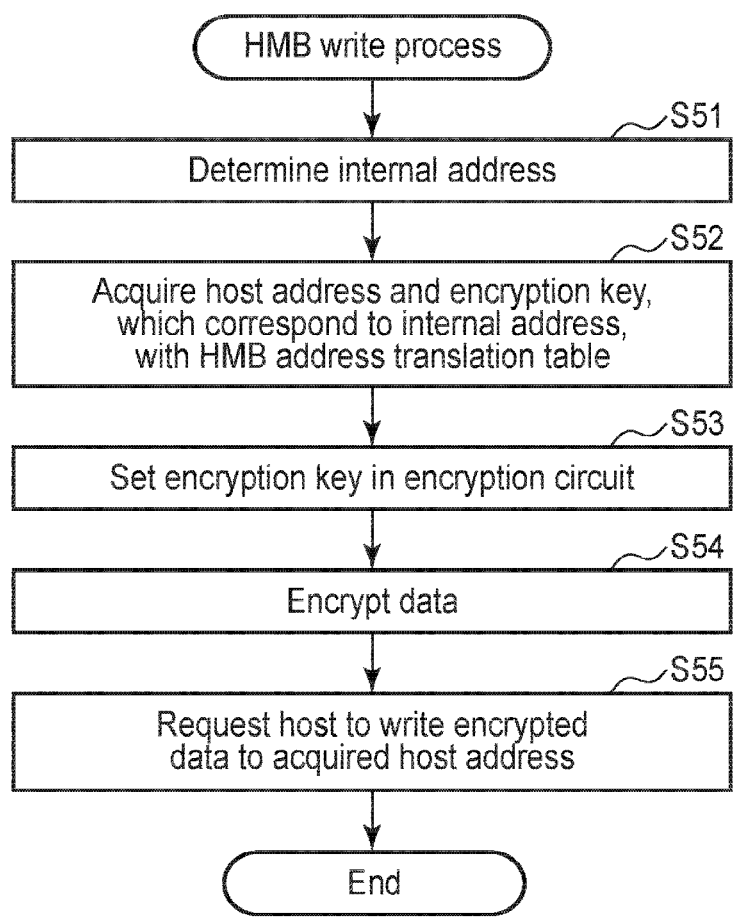
F I G. 19

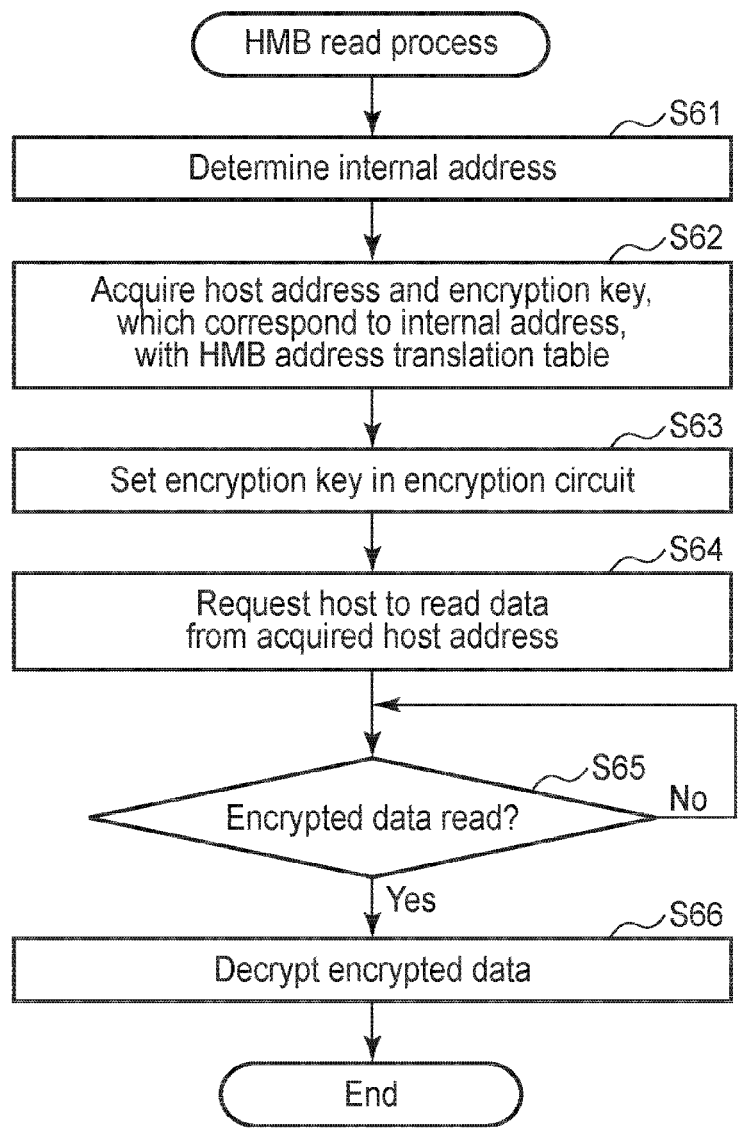
F I G. 20

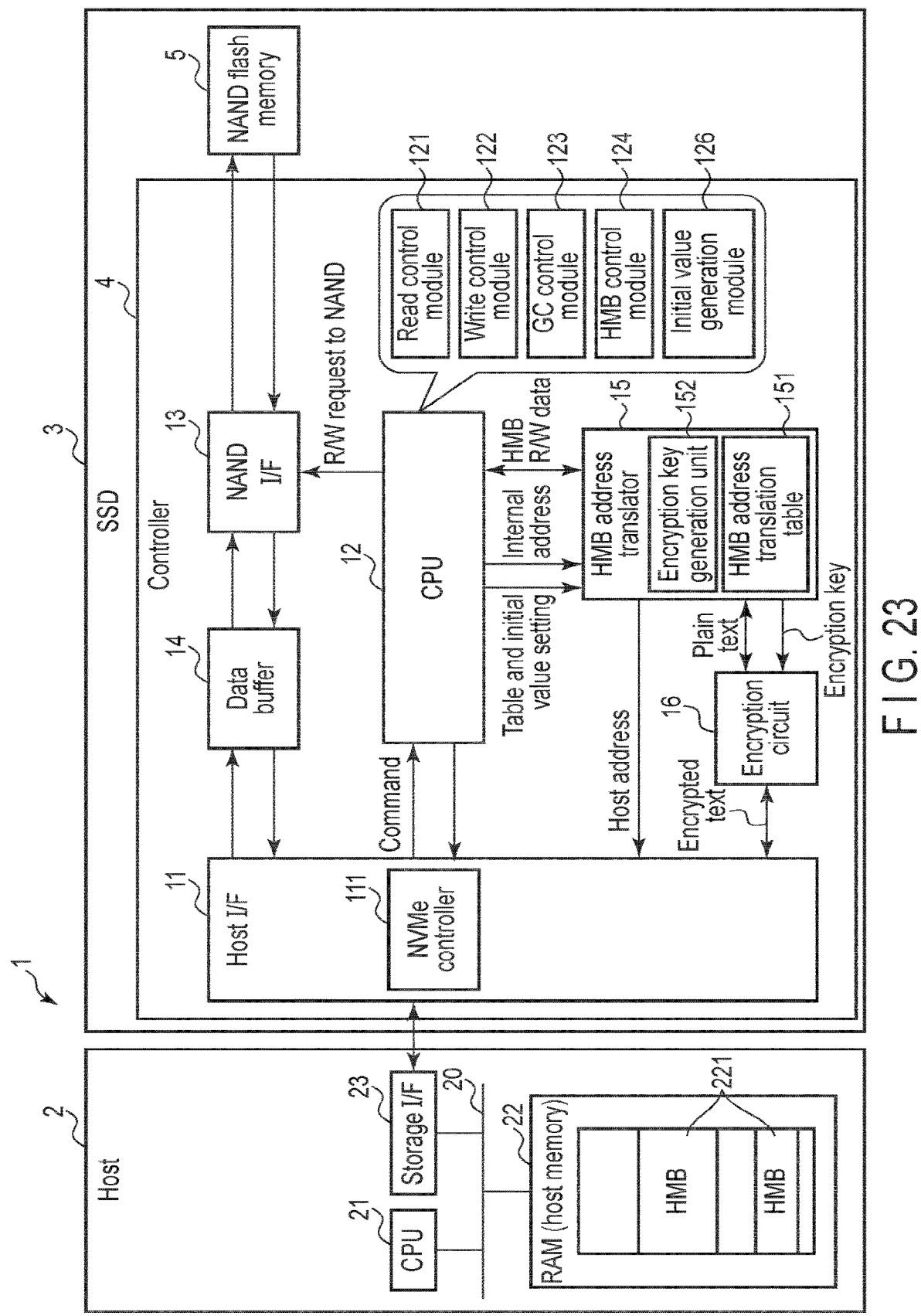
F I G. 23

| Host address | Initial value for encryption key | Write count | Valid |
|---|---|---|---|
| HADDR0 | seedA | 0 | 1 |
| HADDR1 | seedB | 1 | 1 |
| HADDRn | seedC | 3 | 1 |
| HADDR1+8KB | seedD | 0 | 1 |
| HADDR2 | seedE | 2 | 1 |
| HADDR2+4KB | seedF | 1 | 1 |
F I G. 24
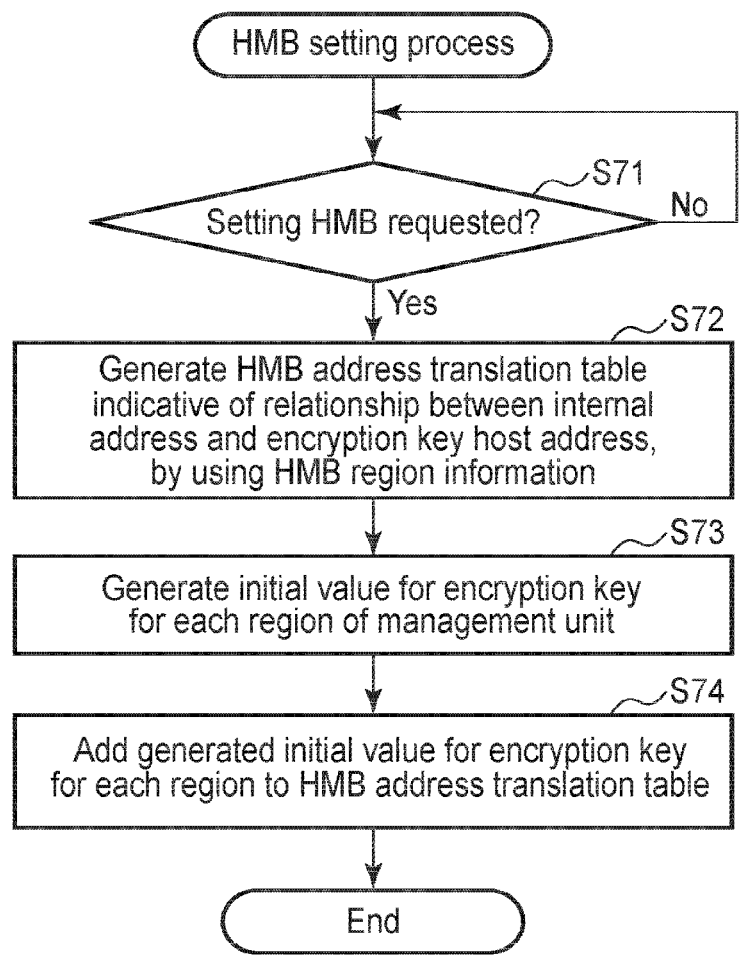
F I G. 25

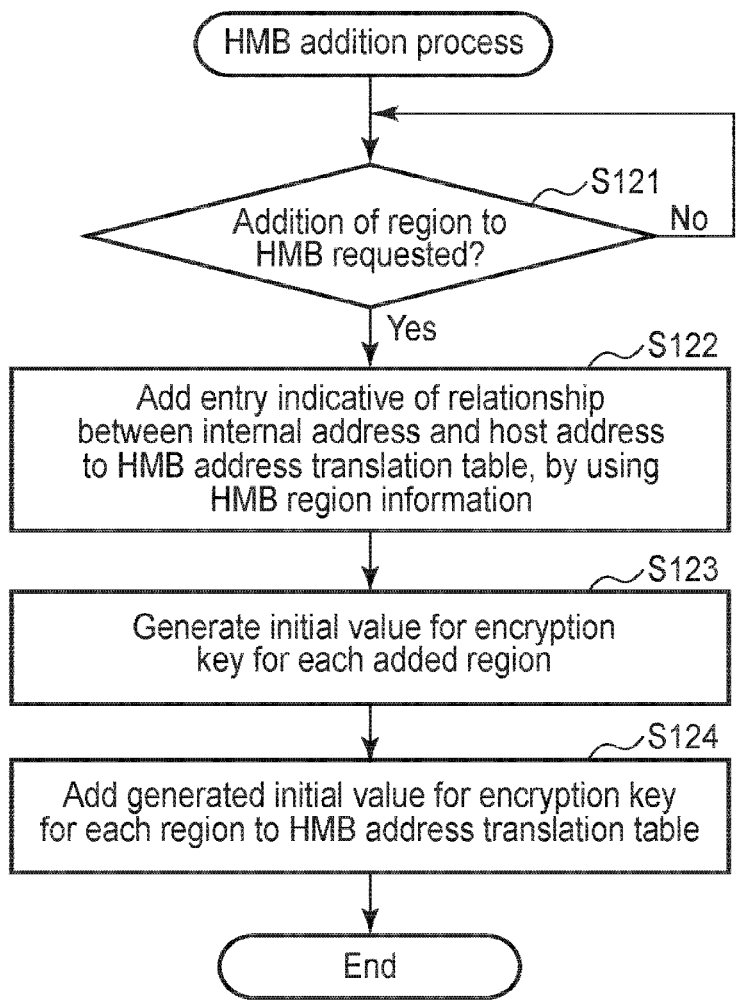
F I G. 26

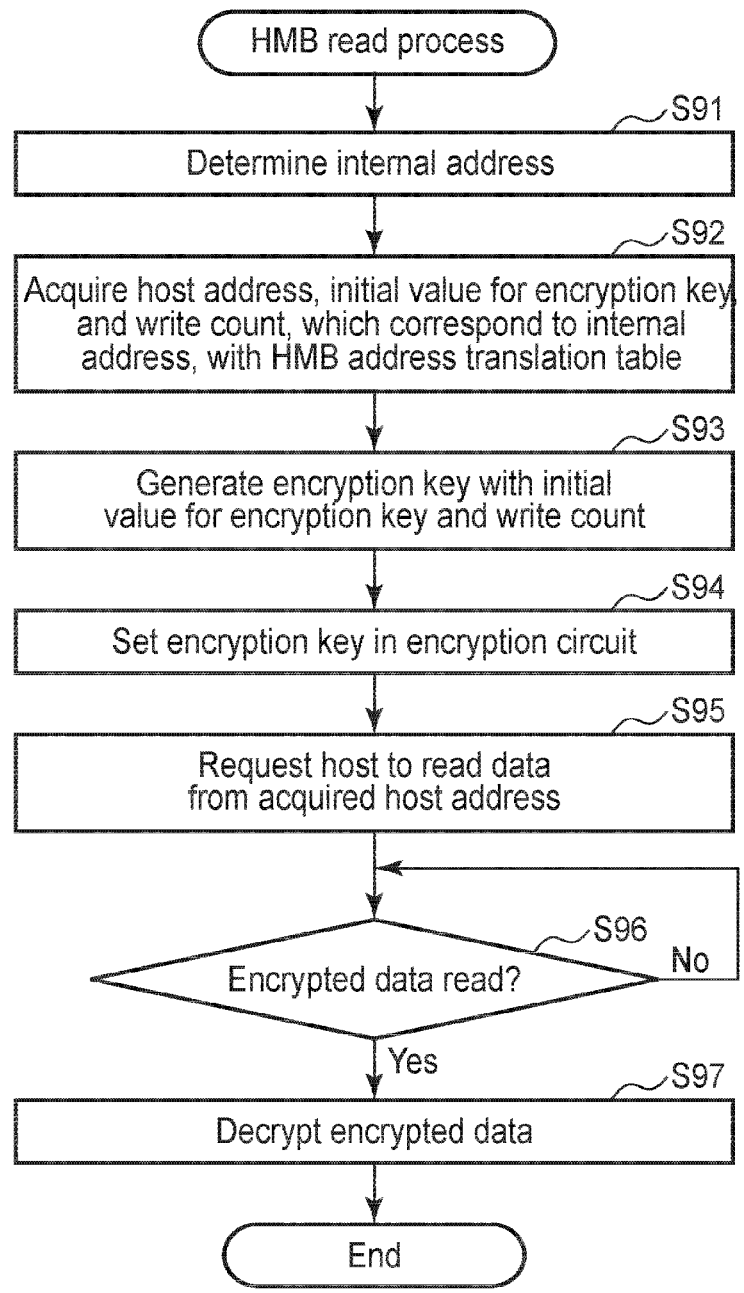
F I G. 28

MEMORY SYSTEM

CROSS-REFERENCE TO RELATED APPLICATIONS

This application is based upon and claims the benefit of priority from Japanese Patent Application No. 2019-165396, filed Sep. 11, 2019, the entire contents of which are incorporated herein by reference.

FIELD

Embodiments described herein relate generally to a memory system including a nonvolatile memory.

BACKGROUND

In recent years, memory systems including nonvolatile memories are widely prevailing.

As a type of the memory systems, a solid state drive (SSD) including a NAND flash memory is known. SSDs are used as main storages of various computing devices.

An SSD may support a host memory buffer (HMB) function. The HMB function is a function of using a portion of a random access memory (RAM) in a host as a temporary memory region. The region of the RAM in the host, which is used as the temporary memory region, is referred to as an HMB. The processing of the SSD can be accelerated by using not only a RAM in the SSD but also the HMB, as the temporary memory regions.

BRIEF DESCRIPTION OF THE DRAWINGS

FIG. 1 is a block diagram illustrating a configuration example of an information processing system including a memory system according to a first embodiment.

FIG. 2 is a diagram illustrating a configuration example of a Host Memory Buffer Descriptor List used by the memory system of the first embodiment.

FIG. 3 is a diagram illustrating a configuration example of a Host Memory Buffer Descriptor Entry included in the Host Memory Buffer Descriptor List of FIG. 2.

FIG. 4 is a diagram illustrating a relationship between an address space of a host memory buffer recognized by the memory system of the first embodiment, and regions in a host memory.

FIG. 5 is a block diagram illustrating a configuration example of an information processing system including a memory system of a comparative example.

FIG. 6 is a diagram illustrating a first example in which data stored in the host memory by the memory system of the comparative example is tampered with.

FIG. 9 is a flowchart illustrating an example of the procedure of an HMB setting process executed in the memory system of the first embodiment.

FIG. 10 is a flowchart illustrating an example of the procedure of an HMB addition process executed in the memory system of the first embodiment.

FIG. 11 is a flowchart illustrating an example of the procedure of an HMB write process executed in the memory system of the first embodiment.

FIG. 12 is a flowchart illustrating an example of the procedure of an HMB read process executed in the memory system of the first embodiment.

FIG. 13 is a diagram illustrating a second example in which data stored in the host memory is tampered with.

FIG. 16 is a diagram illustrating a configuration example of an HMB address translation table used in the memory system of the second embodiment.

FIG. 17 is a flowchart illustrating an example of the procedure of an HMB setting process executed in the memory system of the second embodiment.

FIG. 18 is a flowchart illustrating an example of the procedure of an HMB addition process executed in the memory system of the second embodiment.

FIG. 19 is a flowchart illustrating an example of the procedure of an HMB write process executed in the memory system of the second embodiment.

FIG. 20 is a flowchart illustrating an example of the procedure of an HMB read process executed in the memory system of the second embodiment.

FIG. 21 is a diagram illustrating a third example in which data stored in the host memory is tampered with.

FIG. 23 is a block diagram illustrating a configuration example of an information processing system including the memory system of the third embodiment.

FIG. 24 is a diagram illustrating a configuration example of an HMB address translation table used in the memory system of the third embodiment.

FIG. 25 is a flowchart illustrating an example of the procedure of an HMB setting process executed in the memory system of the third embodiment.

FIG. 26 is a flowchart illustrating an example of the procedure of an HMB addition process executed in the memory system of the third embodiment.

FIG. 28 is a flowchart illustrating an example of the procedure of an HMB read process executed in the memory system of the third embodiment.

DETAILED DESCRIPTION

Figure 6:
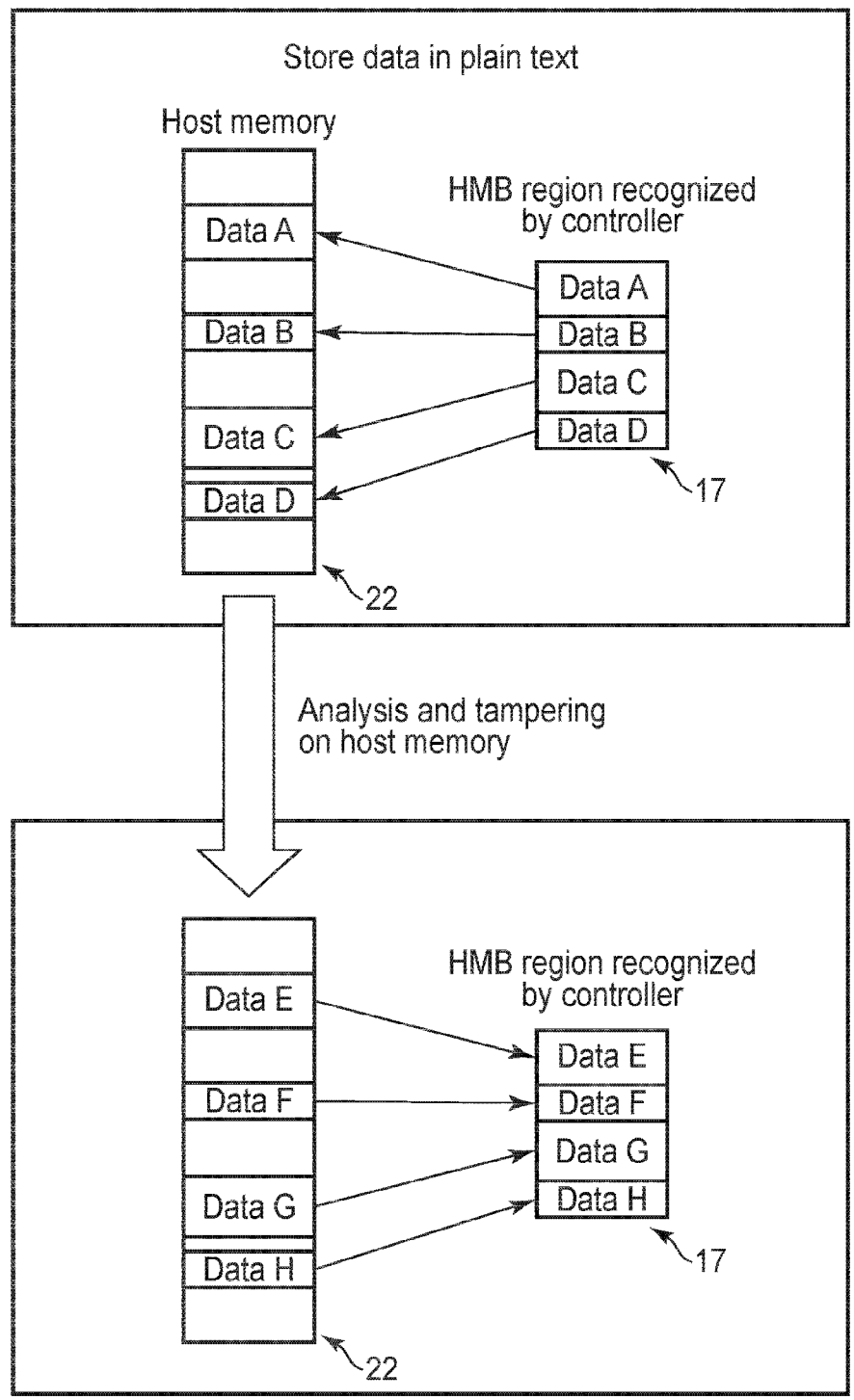

Embodiments will be described hereinafter with reference to the accompanying drawings.

In general, according to one embodiment, a memory system includes a nonvolatile memory and a controller. The controller controls the nonvolatile memory, writes data to a random access memory in a host, and reads data from the random access memory. The random access memory includes regions in first units to which the controller is accessible. The controller uses encryption keys associated with the regions, respectively, for encrypting data to be written into each of the regions and decrypting data read from each of the regions.

First Embodiment

First, a configuration of an information processing system 1 that includes a memory system according to a first embodiment will be described with reference to FIG. 1.

The memory system is a semiconductor storage device configured to write data to a nonvolatile memory such as a NAND flash memory 5 and to read data from the nonvolatile memory. The semiconductor storage device is also simply referred to as a storage device. This memory system is implemented as, for example, a solid state drive (SSD) 3 that includes a NAND flash memory. The case in which the memory system (i.e., storage device) is implemented as the SSD 3 will be exemplified below, but the memory system may also be implemented as a hard disk drive (HDD).

The information processing system 1 includes a host device 2 (hereinafter also referred to as a host 2) and the SSD 3. The host 2 may be a storage server configured to store a large amount of various types of data in the SSD 3 or may be a personal computer.

The SSD 3 may be used as a storage of an information processing apparatus that functions as the host 2. The SSD 3 may be incorporated in the information processing apparatus or may be connected to the information processing apparatus through a cable or network.

An interface, which connects the host 2 and the SSD 3, conforms to SCSI, Serial Attached SCSI (SAS), ATA, Serial ATA (SATA), PCI Express (PCIe) (registered trademark), Ethernet (registered trademark), Fibre channel, NVM Express (NVMe) (registered trademark), and the like.

The host 2 includes a CPU 21, a random access memory (RAM) 22, and a storage interface (storage I/F) 23. The CPU 21, the RAM 22, and the storage I/F 23 may be connected via a bus 20. The host 2 is connected to the SSD 3 via the storage I/F 23. The storage I/F 23 conforms to the above-described interface standards for connection between the host 2 and the SSD 3.

The CPU 21 is a processor configured to control each unit in the host 2. The CPU 21 performs various processes by executing Basic Input/Output System (BIOS), an operating system (OS) and the like stored in ROM and the like (not shown).

The RAM 22 is a temporary memory region (also referred to as a work region) in which various data used by the CPU 21 is temporarily stored. The RAM 22 may be a dynamic RAM (DRAM) or a static RAM (SRAM). The RAM 22 in the host 2 is also referred to as a host memory 22 in the following descriptions.

The SSD 3 includes a controller 4 and a NAND flash memory 5. The controller 4 may be implemented by a circuit such as a System-on-a-chip (SoC).

The controller 4 includes a data buffer 14. The data buffer 14 includes buffer regions in which data to be written into the NAND flash memory 5 and data read from the NAND flash memory 5 are temporarily stored. The data buffer 14 may be implemented as, for example, a RAM that is an SRAM or a DRAM. The data buffer 14 may be provided outside the controller 4. In this case, the controller 4 accesses the data buffer 14 via an interface in the controller 4.

The controller 4 further supports a host memory buffer (HMB) function. For example, the SSD 3 conforming to the NVMe standard Revision 1.2 or later may support the HMB function. The HMB function is a function in which the controller 4 exclusively uses at least a partial region allocated in the host memory 22 as a temporary memory region. The controller 4 can exclusively use the partial region in the host memory 22 with the HMB function.

The region in the host memory 22 allocated to the controller 4 is also referred to as a host memory buffer (HMB) 221. The HMB 221 may be composed of a single region in the host memory 22, or may be composed of dispersed regions in the host memory 22. The controller 4 can use the HMB 221 in the host memory 22 as a temporary memory region that includes a buffer region, a cache region, a storage region for various data, during a period from the time when the HMB function is enabled to the time when the HMB function is disabled. The HMB function is disabled when, for example, the SSD 3 is started, and is enabled in response to a request from the host 2.

The controller 4 may receive from the host 2 HMB region information including a list together with a command to request enablement of the HMB function. The list indicates one or more regions in the host memory 22. The controller 4 may use the one or more regions as the HMB 221 during a period from the time when the HMB function is enabled in response to the command to the time when the HMB function is disabled. The HMB region information is, for example, a Host Memory Buffer Descriptor List defined under NVMe. A method of using the one or more regions in the host memory 22 as the HMB 221, on the basis of the HMB region information will be described later with reference to FIG. 2 to FIG. 4.

The NAND flash memory 5 includes blocks. Each of the blocks includes pages. The blocks each function as a minimum unit of a data erase operation. A block may be referred to as an erase block or a physical block. Each of the pages includes memory cells connected to a single word line. The pages each function as a unit of a data write operation and a data read operation. Note that a word line may be used as a unit of a data write operation and a data read operation.

The tolerable maximum number of program/erase cycles (maximum number of P/E cycles) for each of the blocks is limited. One P/E cycle of a block includes an erase operation to make all memory cells in the block become an erased state and a write operation of writing data to each pages of the block.

The controller 4 is electrically connected to the NAND flash memory 5 through a NAND interface (NAND I/F) 13 conforming to an interface standard such as a Toggle DDR or an open NAND flash interface (ONFI). The NAND I/F 13 functions as a NAND control circuit configured to control the NAND flash memory 5.

The NAND I/F 13 may be connected to NAND flash memory chips in the NAND flash memory 5 via multiple channels (Ch). By operating the NAND flash memory chips in parallel, it is possible to broaden an access bandwidth to the NAND flash memory 5.

The controller 4 functions as a memory controller configured to control the NAND flash memory 5.

The controller 4 may function as a flash translation layer (FTL) configured to execute data management and block management of the NAND flash memory 5. The data management executed by the FTL includes (1) management of mapping data indicative of relationship between each logical address and each physical address of the NAND flash memory 5, (2) process to hide read/write operations in units of pages and erase operations in units of blocks, and the like. The logical address is an address used by the host 2 for addressing the SSD 3. As a logical address, a logical block address (LBA) is assumed to be used in the following descriptions.

The controller 4 executes management of mapping between each LBA and each physical address with a logical-to-physical address translation table. The controller 4 manages mapping between each LBA and each physical address in units of specific management sizes, by using the logical-to-physical address translation table. A physical address corresponding to an LBA indicates a physical memory location in the NAND flash memory 5 in which data of the LBA is written. The controller 4 may load the logical-to-physical address translation table from the NAND flash memory 5 onto a RAM (not shown) in the SSD 3 when the SSD 3 is powered on.

Data write into one page is executable only once in a single P/E cycle. When the controller 4 updates data corresponding to an LBA, the controller 4 writes update data not to a first physical memory location in which previous data corresponding to the LBA is stored, but to a second physical memory location different from the first physical memory location. Then, the controller 4 updates the logical-to-physical address translation table to associate the LBA with the second physical memory location, and thereby invalidate the previous data stored in the first physical memory location.

The block management includes, management of defective blocks, wear leveling, and garbage collection (GC). The GC is also referred to as compaction.

To realize the above-described functions such as address translation, wear leveling, and GC, the controller 4 needs to read and write a large amount of data such as the logical-to-physical address translation table, system data including internal information of the controller 4, and fragmented user data from and to the NAND flash memory 5. The user data is data which the host 2 instructs the SSD 3 to write and data designated in a write request (for example, a write command) from the host 2. The SSD 3 receives user data associated with a write request from the host 2 in accordance with reception of the write request.

Examples of a method for efficiently handling a large amount of data as described above include a method of reading data from the NAND flash memory 5 onto a memory that has higher access speed (SRAM, DRAM and the like). However, incorporating a large-capacity and higher-speed memory may increase the cost of the SSD 3.

The above-described HMB function may be employed as a method of suppressing increase in the capacity of the memory. The controller 4 uses a part of the host memory 22 as a temporary memory region with the HMB function. Various data, which may be stored in the memory (for example, the data buffer 14) in the SSD 3, may also be stored in the HMB 221. The data stored in the HMB 221 may include the logical-to-physical address translation table, user data, user data on which a process such as an encryption process and a NAND optimization process is performed, and data for executing various processes. The NAND optimization process is, for example, a process of randomizing data. The data for executing various processes is, for example, a counter indicative of the number of valid clusters of each block in the NAND flash memory 5, which is used for a GC process, and a counter indicative of the number of read operations performed on each block in the NAND flash memory 5, which is used for a measure against read disturb. Use of the HMB 221 enables the process such as FTL to be accelerated without increasing the capacity of the memory in the SSD 3.

The controller 4 may include a host interface (host I/F) 11, a CPU 12, the NAND I/F 13, the data buffer 14, an HMB address translator 15, and an encryption circuit 16. The host I/F 11, the CPU 12, the NAND I/F 13, the data buffer 14, the HMB address translator 15, and the encryption circuit 16 may be connected via a bus.

The CPU 12 is a processor configured to control each unit in the controller 4. The CPU 12 performs various processes by executing firmware (FW) stored in a ROM (not shown) or the like. The CPU 12 may perform, in addition to the above-described processes of FTL, command processes to process various commands from the host 2. The FW executed by the CPU 12 controls the operation of the CPU 12. Note that a dedicated hardware in the controller 4 may execute part of or the entire FTL processes and the command processes.

The host I/F 11 functions as a circuit of controlling communications with the host 2 and receiving commands. The host I/F 11 includes an NVMe controller 111. The NVMe controller 111 performs a process conforming to a protocol defined by an interface for communications between the SSD 3 and the host 2 (for example, NVMe protocol). The NVMe controller 111 receives various commands, which include, for example, various control commands and I/O commands, from the host 2. The control commands may include a command for a request to enable or disable the HMB function (for example, Set Features command). The I/O commands may include a write command and a read command.

The host 2 transmits a command for a request to enable the HMB function to the SSD 3 in response to, for example, changing the user using the host 2, powering on the host 2, or transitioning the SSD 3 from a power-saving mode to a normal mode. This command is, for example, a Set Features command that indicates enabling the HMB function. The host 2 may transmit to the SSD 3 region information together with the command, to designate one or more regions in the host memory 22 to be used as the HMB 221. The region information includes a list indicative of the one or more regions. For example, the Set Features command includes a pointer to the region information. The SSD 3 uses this pointer to receive the region information of the regions in the host memory 22 to be used as the HMB 221 from the host 2.

In addition, the host 2 transmits a command for a request to disable the HMB function to the SSD 3 before, for example, the user using the host 2 is changed, the host 2 is powered off, or the SSD 3 is transitioned from the normal mode to the power-saving mode. This command is, for example, a Set Features command that indicates disabling the HMB function.

The NVMe controller 111 sends a request indicative of enabling the HMB function to the CPU 12 in response to the command from the host 2 for a request to enable the HMB function. In addition, the NVMe controller 111 sends the region information, which designating the regions in the host memory 22 to be used as the HMB 221, to the CPU 12. In response to this request, the CPU 12 enables the HMB function, and causes the HMB address translator 15 to generate an HMB address translation table 151 to use the regions designated by the region information as the HMB 221.

The NVMe controller 111 sends a request indicative of disabling the HMB function to the CPU 12 in response to the command from the host 2 for a request to disable the HMB function. The CPU 12 disables the HMB function in response to this request. The CPU 12 causes the HMB address translator 15 to update the HMB address translation table 151 such that, for example, the regions in the host memory 22, which have been used as the HMB 221, are not used.

The NVMe controller 111 may further transmit data to be written into the HMB 221 to the host 2 and receive data read from the HMB 221 from the host 2 during a period from the time when the HMB function is enabled to the time when the HMB function is disabled. In other words, the NVMe controller 111 may perform a process for writing data into the HMB 221 and a process for reading data from the HMB 221 during the period from the time when the HMB function is enabled to the time when the HMB function is disabled. The data to be written into the HMB 221 is data which the controller 4 will write into the HMB 221 and data which has not been written actually.

For example, a Host Memory Buffer Descriptor List defined under NVMe is used as the region information indicative of one or more regions to be used as the HMB 221.

FIG. 2 illustrates a configuration example of the Host Memory Buffer Descriptor List. The Host Memory Buffer Descriptor List includes one or more Host Memory Buffer Descriptor Entries that correspond to one or more regions in the host memory 22, respectively. Each Host Memory Buffer Descriptor Entry includes information for specifying a region in the host memory 22, which is used as the HMB 221.

As illustrated in FIG. 2, one or more Host Memory Buffer Descriptor Entries each have a length of 16 bytes (=128 bits) and are arranged sequentially in the Host Memory Buffer Descriptor List.

FIG. 3 illustrates a configuration example of a Host Memory Buffer Descriptor Entry. A field [63:0] of 0th to 63rd bits in the Host Memory Buffer Descriptor Entry indicates a buffer address of a corresponding region. The buffer address indicates a starting host address of the region, and is represented as a host address aligned to a memory page size (i.e., a host address in MPS units). The memory page is a minimum access unit to the host memory 22. The MPS indicates the size of the memory page, and is, for example, 4 KB or 8 KB.

A field [95:64] of 64th to 95th bits in the Host Memory Buffer Descriptor Entry indicates a buffer size of a corresponding region. This region includes one or more regions in MPS units. In addition, the one or more regions in MPS units constitute contiguous regions in the host memory 22. The buffer size is represented as the number of the one or more contiguous regions in MPS units, which are included in the corresponding region. A region of MPS unit is also referred to as an MPS region in the following descriptions.

A field [127:96] of 96th to 127th bits is an unused Reserved region.

The CPU 12 causes the HMB address translator 15 to generate (or update) the HMB address translation table 151 by using HMB region information 25 received from the host 2 via the NVMe controller 111.

An example of generating the HMB address translation table 151 with the HMB region information 25 will be described with reference to FIG. 4. To make the descriptions easily understood, an example in which the HMB region information 25 is a Host Memory Buffer Descriptor List and the MPS is 4 KB will be described below.

In the example illustrated in FIG. 4, three regions 61, 62, and 63 in the host memory 22 are used as the HMB 221. As shown in the HMB region information 25, the three regions 61, 62, and 63 are composed of: (1) the first region 61 where the buffer address (i.e., the starting host address of the region) is HADDR0 and the buffer size is one; (2) the second region 62 where the buffer address is HADDR1 and the buffer size is three; and (3) the third region 63 where the buffer address is HADDR2 and the buffer size is two. In addition, the three regions 61, 62, and 63 are not contiguous regions but dispersed regions in the host memory 22.

The first region 61 includes one MPS region since the buffer size is one. The second region 62 includes three MPS regions 62-1, 62-2, and 62-3 since the buffer size is three. The third region 63 includes two MPS regions 63-1 and 63-2 since the buffer size is two. That is, the HMB 221, which is composed of the first region 61, the second region 62, and the third region 63, includes the six MPS regions. Therefore, the HMB region information 25 is considered to indicate the six MPS regions in the three regions 61, 62, and 63 with the pairs of the buffer address and buffer size that correspond to the three regions 61, 62, and 63, respectively.

The CPU 12 and the HMB address translator 15 set a virtual memory space to access the three dispersed regions 61, 62, and 63, i.e., the six MPS regions in the three regions 61, 62, and 63 as the contiguous HMB regions 17. This is because if each unit (for example, the CPU 12) in the controller 4 directly accesses the dispersed regions 61, 62, and 63, operations of each unit become complicated.

The CPU 12 and the HMB address translator 15 generate the HMB address translation table 151 on the basis of the set memory space. The HMB address translation table 151 includes address translation information. The address translation information indicates relationship between an internal address indicative of a location in the set memory space and a host address indicative of an actual location in the host memory 22 including the regions 61, 62, and 63.

When the CPU 12 designates a location in the HMB regions 17 to be accessed with an internal address, the HMB address translator 15 determines the host address corresponding to the designated internal address with the HMB address translation table 151. That is, the HMB address translator 15 has an address translation mechanism for handling the dispersed three regions 61, 62, and 63 as the HMB regions 17, i.e., a contiguous memory space. The CPU 12 can thereby access the HMB 221 in the host memory 22 via the HMB address translator 15.

More specifically, the CPU 12 and the HMB address translator 15 map an internal address HMB_base indicative of a starting part of the HMB regions 17 onto the host address indicative of a starting part of one of the regions 61, 62, and 63 (in FIG. 4, the region 61). Then, the CPU 12 and the HMB address translator 15 contiguously map the three regions 61, 62, and 63 onto the memory space of the HMB regions 17 including the internal address HMB_base as the starting part, in accordance with the host address (buffer address) and the buffer size of each of the regions 61, 62, and 63 indicated by the HMB region information 25. The HMB address translation table 151 indicates the relationship between internal addresses and host addresses based on such mapping.

The example of FIG. 4 illustrates internal addresses in management units (in this example, 4 KB (MPS) units) in the memory space of the HMB regions 17. The internal addresses include HMB_base as the starting part, HMB_base+0x1000, HMB_base+0x2000, . . . , HMB_base+0x6000. The CPU 12 divides each of the regions 61, 62, and 63 indicated in the HMB region information 25 into management units. Then, the CPU 12 maps an internal address onto the host address indicative of the starting part of each of the regions in the management units obtained by the division. Each of the regions in the management units is a region which the controller 4 can access.

The HMB address translation table 151 illustrated in FIG. 4 includes six entries indicative of the following mapping:

(1) mapping between the internal address "HMB_base" and the host address "HADDR0" indicative of the starting part of the first region 61;
(2) mapping between the internal address "HMB_base+ 0x1000" and the host address "HADDR1" indicative of the starting part of the second region 62;
(3) mapping between the internal address "HMB_base+ 0x2000" and the host address "HADDR1+4 KB" indicative of the starting part of the second MPS region 62-2 in the second region 62;
(4) mapping between the internal address "HMB_base+ 0x3000" and the host address "HADDR1+8 KB" indicative of the starting part of the third MPS region 62-3 in the second region 62;
(5) mapping between the internal address "HMB_base+ 0x4000" and the host address "HADDR2" indicative of the starting part of the third region 63; and
(6) mapping between the internal address "HMB_base+ 0x5000" and the host address "HADDR2+4 KB" indicative of the starting part of the second MPS region 63-2 in the third region 63.

The HMB address translation table 151 does not include the internal addresses themselves. The relationship between each internal address starting from HMB_base and each host address is indicated by the location (order) of each entry, which includes the host address, in the HMB address translation table 151. As described above, the host address HADDR0 included in the first entry in the HMB address translation table 151 corresponds to the internal address HMB_base indicative of the starting part of the HMB regions 17. On the basis of a relative location of an internal address to HMB_base, the HMB address translator 15 can therefore determine the entry in the HMB address translation table 151 that corresponds to the internal address. That is, the HMB address translator 15 can specify the MPS region corresponding to the internal address (more specifically, the MPS region including the host address, which corresponds to this internal address). Note that the HMB address translation table 151 may include the internal addresses.

A valid field in the HMB address translation table 151 indicates whether the region is valid or not. In the valid field, for example, "1" is set when the CPU 12 can use the region as the HMB 221 and "0" is set when the CPU 12 cannot use the region as the HMB 221. The HMB address translation table 151 illustrated in FIG. 4 indicates that the six MPS regions included in the three regions 61, 62, and 63 are valid and that the CPU 12 can use these MPS regions.

When the CPU 12 designates a location in the HMB regions 17 to be accessed with an internal address, the HMB address translator 15 can determine the host address corresponding to the designated internal address by using the HMB address translation table 151. The CPU 12 can therefore access the HMB 221 in the host memory 22 via the HMB address translator 15.

After the HMB address translation table 151 is generated, the CPU 12 may further receive additional HMB region information 25 from the host 2 via the NVMe controller 111. The additional HMB region information 25 indicates a region (or regions) in the host memory 22 additionally allocated as the HMB 221 while the HMB 221 is used. In this case, the CPU 12 and the HMB address translator 15 map such that the region indicated by the additional HMB region information 25 can be handled as a part of the HMB regions 17 that is the contiguous virtual memory space. The CPU 12 and the HMB address translator 15 then update the HMB address translation table 151 on the basis of the mapping.

The descriptions will return to FIG. 1. The encryption circuit 16 is an encryption/decryption circuit that performs data encryption and decryption. The encryption circuit 16 may encrypt data to be written into the HMB 221 and decrypt data read from the HMB 221. The encryption circuit 16 uses an encryption key to perform data encryption and decryption. The encryption key is generated by, for example, the CPU 12 and is set (stored) in the encryption circuit 16.

The CPU 12 may function as a read control module 121, a write control module 122, a GC control module 123, an HMB control module 124, and an encryption key generation module 125.

The read control module 121 reads user data from the NAND flash memory 5 in accordance with a read command. The read control module 121 caches the read user data to the data buffer 14. The read control module 121 may control each unit in the controller 4 such that the read user data is cached to the HMB 221. That is, the read control module 121 may use the data buffer 14 and the HMB 221 as read buffers that store the read user data.

The write control module 122 writes user data, which is received from the host 2 in accordance with reception of a write command, into the NAND flash memory 5. The write control module 122 caches the user data, which is to be written into the NAND flash memory 5, to the data buffer 14. The write control module 122 may control each unit in the controller 4 such that the user data, which is to be written into the NAND flash memory 5, is cached to the HMB 221. That is, the write control module 122 may use the data buffer 14 and the HMB 221 as write buffers that store the user data to be written.

The GC control module 123 may also write data into the NAND flash memory 5 similarly to the write control module 122. As described above, the NAND flash memory 5 includes blocks. The blocks are roughly classified into blocks which store valid data (i.e., active blocks), and blocks which do not store valid data and can be used for writing new data by performing an erase process (i.e., free blocks). The GC control module 123 selects a block from one or more free blocks and performs the erase process on the block. Then, the GC control module 123 allocates the block as a write destination block. The write destination block may store valid data.

The GC control module 123 selects a garbage collection source block (GC source block) from the active blocks which store valid data. Then, the GC control module 123 writes the valid data in the GC source block to a garbage collection destination block (GC destination block) allocated as the write destination block from the free blocks. At this time, the GC control module 123 may control each unit in the controller 4 such that the valid data in the GC source block is cached to the HMB 221. That is, the GC control module 123 may use the data buffer 14 and the HMB 221 as GC buffers that store the valid data.

The HMB control module 124 controls enablement/disablement of the HMB function. As described above, the NVMe controller 111 sends a request, which indicates the enablement of the HMB function and the HMB region information 25 designating regions to be used as the HMB 221, to the CPU 12. The HMB region information 25 includes a list indicative of one or more regions in the host memory 22.

The HMB control module 124 controls access to the HMB 221. More specifically, the HMB control module 124 enables the HMB function in response to the request indicative of the enablement of the HMB function. Then, the HMB control module 124 urges the HMB address translator 15 to manage one or more regions in the host memory 22 as the HMB 221 by using the HMB region information 25 including the list indicative of the one or more regions, during a period from the time when the HMB function is enabled to the time when the HMB function is disabled. More specifically, the HMB control module 124 urges the HMB address translator 15 to generate the HMB address translation table 151 to manage the HMB 221.

As described above, the NVMe controller 111 sends a request indicative of disablement of the HMB function to the CPU 12. The HMB control module 124 disables the HMB function in response to the request indicative of the disablement of the HMB function.

The encryption key generation module 125 generates an encryption key and sets the encryption key in the encryption circuit 16. The encryption key generation module 125 generates the encryption key in accordance with, for example, enablement of the HMB function.

In addition, the HMB control module 124 can write data into the HMB 221 and read data from the HMB 221 via the HMB address translator 15 and the encryption circuit 16.

More specifically, when writing data (hereinafter referred to as HMB write data) into the HMB 221, the HMB control module 124 sends the HMB write data and an internal address into which the HMB write data is to be written, to the HMB address translator 15.

The HMB address translator 15 translates the internal address sent from the CPU 12 into the host address, with the HMB address translation table 151. For example, the HMB address translator 15 specifies the entry in the HMB address translation table 151 that corresponds to the internal address and acquires the host address included in the entry, and the internal address is thereby translated into the host address.

In addition, the HMB address translator 15 sends the HMB write data to the encryption circuit 16. The encryption circuit 16 encrypts the HMB write data with the set encryption key to obtain the encrypted HMB write data (i.e., HMB write data of an encrypted text).

The host address and the encrypted HMB write data are transmitted to the host 2 via the host I/F 11 including the NVMe controller 111. In the host 2, the encrypted HMB write data is written into the region in the host memory 22, which is specified by the host address.

As a result, the HMB control module 124 can write the encrypted HMB write data to the designated internal address.

In addition, when there is data to be read from the HMB 221, the HMB control module 124 sends an internal address from which the data is to be read, to the HMB address translator 15. Then, the HMB address translator 15 translates the internal address sent from the CPU 12 into the host address, by using the HMB address translation table 151.

The host address is transmitted to the host 2 via the host I/F 11 including the NVMe controller 111. Thus, encrypted data (hereinafter also referred to as HMB read data of an encrypted text) is read from the region in the host memory 22, which is specified by the host address, and is transmitted to the SSD 3.

The encryption circuit 16 receives the HMB read data of the encrypted text via the host I/F 11. The encryption circuit 16 decrypts the HMB read data of the encrypted text with the set encryption key to obtain decrypted HMB read data (i.e., HMB read data of a plain text). The encryption circuit 16 sends the HMB read data of the plain text to the HMB address translator 15. Then, the HMB address translator 15 sends the HMB read data of the plain text to the CPU 12.

As a result, the HMB control module 124 can read the HMB read data of the plain text from the designated internal address.

Thus, since the SSD 3 can encrypt data to be stored in the external HMB 221, the security in use of the HMB 221 can be improved.

FIG. 5 illustrates a configuration example of an SSD 3A that is a memory system according to a comparative example. The SSD 3A does not include the encryption circuit 16 in comparison with the SSD 3 of the present embodiment, and the CPU 12 of the SSD 3A does not function as the encryption key generation module 125. That is, the SSD 3A of the comparative example does not include a configuration for encrypting data to be stored in the HMB 221.

As illustrated in FIG. 6, when non-encrypted plain text data is stored in the HMB 221, the data may be analyzed and tampered with. The figure illustrates an example in which when data A, B, C, and D are stored in the HMB regions 17 recognized by the controller 4 of the SSD 3A, the data A, B, C, and D are stored as they are in the HMB 221 of the host memory 22. In other words, each of the data A, B, C, and D is stored in the host memory 22 without being encrypted.

The data A, B, C, and D may be analyzed, leaked, or tampered with due to access to the host memory 22. For example, the data A, B, C, and D may be tampered to data E, F, G, and H, respectively. When reading data from the HMB regions 17, the controller 4 reads not the data A, B, C, and D, but the data E, F, G, and H, due to the tampering. The tampered data may cause operation errors of the SSD 3A.

Figures 7, 8:
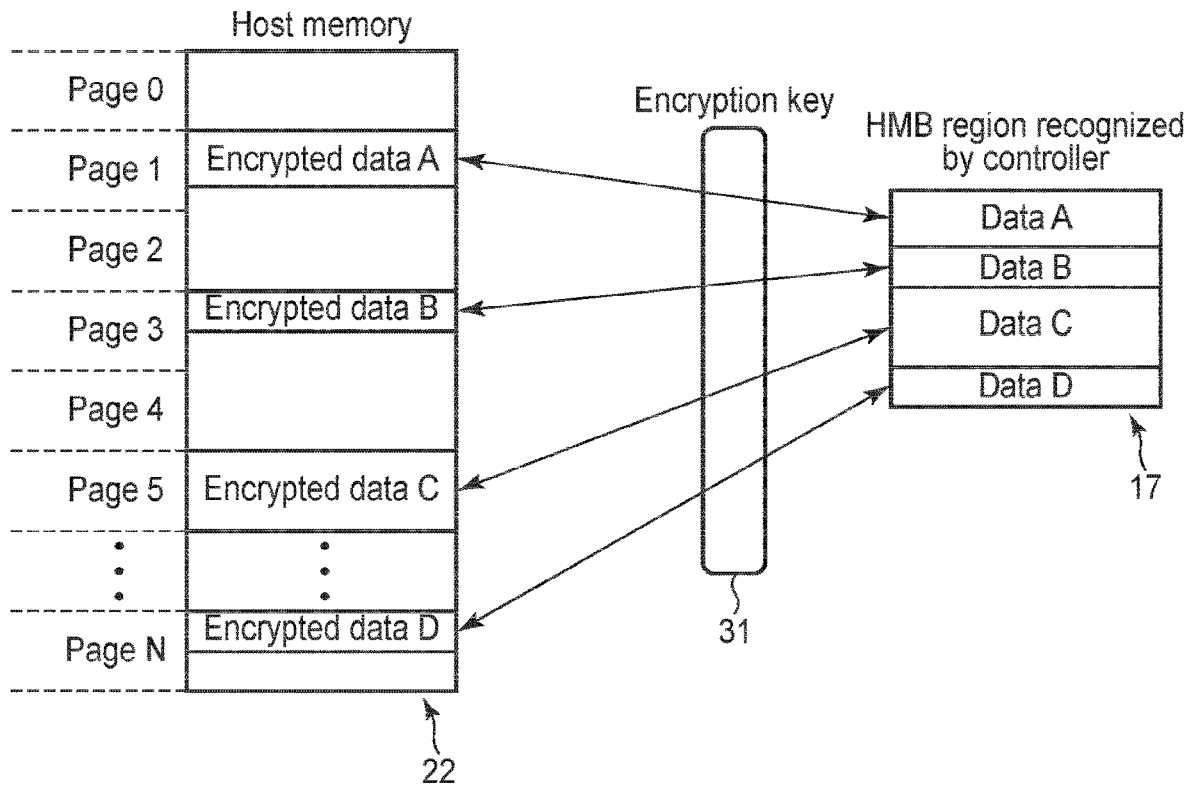
FIG. 7 is a diagram illustrating an example in which data to be stored in the host memory is encrypted by the memory system of the first embodiment.
FIG. 8 is a diagram illustrating a configuration example of an HMB address translation table used in the memory system of the first embodiment.

For this reason, in the present embodiment, as illustrated in FIG. 7, data to be stored in the HMB 221 in the host memory 22 is encrypted. When storing the data A, B, C, and D in the HMB regions 17 recognized by the controller 4 of the SSD 3, the encrypted data A, B, C, and D are stored in the HMB 221 in the host memory 22. In other words, each of the data A, B, C, and D is encrypted by the encryption circuit 16 in which the encryption key 31 is set, and then stored in the host memory 22.

Thus, since the possibility that data stored in the HMB 221 in the host memory 22 is analyzed and tampered with can be reduced in the host 2, the security for the SSD 3 to use the HMB 221 can be improved. In the example illustrated in FIG. 7, regions in the management units in the host memory 22 are represented as pages in MPS units, respectively.

A configuration example of the HMB address translation table 151 will be described in more detail with reference to FIG. 8. The HMB address translation table 151 includes one or more entries. The one or more entries correspond to one or more regions in specific management units that are used as the HMB 221, respectively. Each entry includes a host address field and a valid field. As described above, the specific management unit is, for example, MPS unit.

In an entry corresponding to an HMB region, the host address field indicates a host address corresponding to the region.

The valid field indicates whether the region in the host memory 22 indicated in the entry is valid or not. In the valid field, for example, "1" is set when the controller 4 can use the region as the HMB 221 and "0" is set when the controller 4 cannot use the region as the HMB 221. More specifically, when a region in the host memory 22 is used as the HMB

221, the HMB control module 124 urges the HMB address translator 15 to add an entry corresponding to this region to the HMB address translation table 151. This entry includes the valid field in which "1" is set. In addition, when using a region in the host memory 22 as the HMB 221 is stopped, the HMB control module 124 urges the HMB address translator 15 to set "0" in the valid field in the entry corresponding to this region.

The HMB address translation table 151 includes one or more entries arranged in the order of the internal addresses (for example, an ascending order of the internal addresses). For this reason, as described with reference to FIG. 4, the controller 4 can determine the host address corresponding to an internal address, by using the HMB address translation table 151.

A flowchart of FIG. 9 illustrates an example of the procedure of an HMB setting process performed by the controller 4.

First, the controller 4 determines whether setting the HMB has been requested or not (step S11). For example, when the HMB is enabled or when the controller 4 receives a Host Memory Buffer Descriptor List from the host 2, the controller 4 determines that setting the HMB has been requested. When setting the HMB has not been requested (NO in step S11), the flow returns to step S11 and it is determined again whether setting the HMB has been requested or not.

When setting the HMB has been requested (YES in step S11), the controller 4 generates the HMB address translation table 151 indicative of relationship between an internal address and a host address, by using the HMB region information 25 (for example, Host Memory Buffer Descriptor List) (step S12). The internal address is an address for specifying a location in the HMB regions 17, which are recognized by the controller 4 (more specifically, the CPU 12). The host address is an address for specifying a location in the HMB 221, which is recognized in the host 2. The controller 4 translates an internal address into a host address, with the HMB address translation table 151.

Next, the controller 4 generates an encryption key 31 (step S13). The encryption key 31 is used for encrypting data to be written into the HMB 221 and decrypting data read from the HMB 221. The controller 4 sets the generated encryption key 31 in the encryption circuit 16 (step S16).

By performing the HMB setting process, the controller 4 can generate the HMB address translation table 151 for translating an internal address into a host address and can set the encryption key 31 in the encryption circuit 16.

A flowchart of FIG. 10 illustrates an example of the procedure of an HMB addition process performed by the controller 4. The HMB addition process is a process for further using one or more regions in the host memory 22, which is additionally allocated while the HMB 221 is used, as the HMB 221.

First, the controller 4 determines whether addition of one or more regions to the HMB 221 has been requested or not (step S101). When the controller 4 receives additional HMB region information 25 (for example, an additional Host Memory Buffer Descriptor List) from the host 2, the controller 4 determines that the addition of one or more regions to the HMB 221 has been requested. When the addition of one or more regions to the HMB 221 has not been requested (step S101), the process returns to step S101.

When the addition of one or more regions to the HMB 221 has been requested (YES in step S101), the controller 4 adds entries each including address translation information indicative of relationship between an internal address and a host address, to the HMB address translation table 151, on the basis of the additional HMB region information 25 (step S102). The controller 4 maps such that the regions indicated by the additional HMB region information 25 can be handled as a part of the HMB regions 17 that corresponds to a contiguous virtual memory space. Thus, the HMB regions 17 recognized by the controller 4 are also extended in accordance with the addition of the regions to the HMB 22. When accessing the regions added to the HMB 22, the controller 4 uses the encryption key 31 already set in the encryption circuit 16.

By performing the HMB addition process, the controller 4 can add the entries each of which includes address translation information corresponding to a region added to the HMB 22, to the HMB address translation table 151.

A flowchart of FIG. 11 illustrates an example of the procedure of an HMB write process performed by the controller 4.

The controller 4 determines an internal address in the HMB regions 17 to which data is to be written (step S21). Then, the controller 4 acquires the host address corresponding to the internal address, with the HMB address translation table 151 (step S22).

Next, the controller 4 encrypts the data with the encryption circuit 16 to acquire encrypted data (step S23). The controller 4 requests the host 2 to write the encrypted data to the acquired host address (step S24).

By performing the HMB write process, the controller 4 can write the encrypted data to the HMB 221 in the host memory 22.

A flowchart of FIG. 12 illustrates an example of the procedure of an HMB read process performed by the controller 4.

The controller 4 determines an internal address in the HMB regions 17 from which data is to be read (step S31). The controller 4 acquires the host address corresponding to the internal address, with the HMB address translation table 151 (step S32). Then, the controller 4 requests the host 2 to read data stored in the host address (step S33).

Next, the controller 4 determines whether the encrypted data read from the host memory 22 in response to this request has been received from the host 2 or not (step S34). When the encrypted data has not been received (NO in step S34), the process returns to step S35. In contrast, when the encrypted data has been received (YES in step S34), the controller 4 decrypts the encrypted data with the encryption circuit 16 (step S35).

By performing the HMB read process, the controller 4 can acquire plain text data by reading the encrypted data from the HMB 221 in the host memory 22 and decrypting the encrypted data.

As described above, since the SSD 3 stores data encrypted with the encryption key 31, in the HMB 221, the security in use of the HMB 221 can be improved.

Second Embodiment

In the first embodiment, the single encryption key 31 is used for writing encrypted data into the HMB 221 and decrypting encrypted data read from the HMB 221. In contrast, in a second embodiment, multiple encryption keys different in regions in the management units in the HMB 221 are used for writing encrypted data into the HMB 221 and decrypting encrypted data read from the HMB 221.

The hardware configuration of an SSD 3 according to the second embodiment is similar to the SSD 3 of the first embodiment and is different in only the procedure of the processes executed by the HMB control module 124 and the HMB address translator 15. Only the points different from the first embodiment will be explained below.

Figure 13:
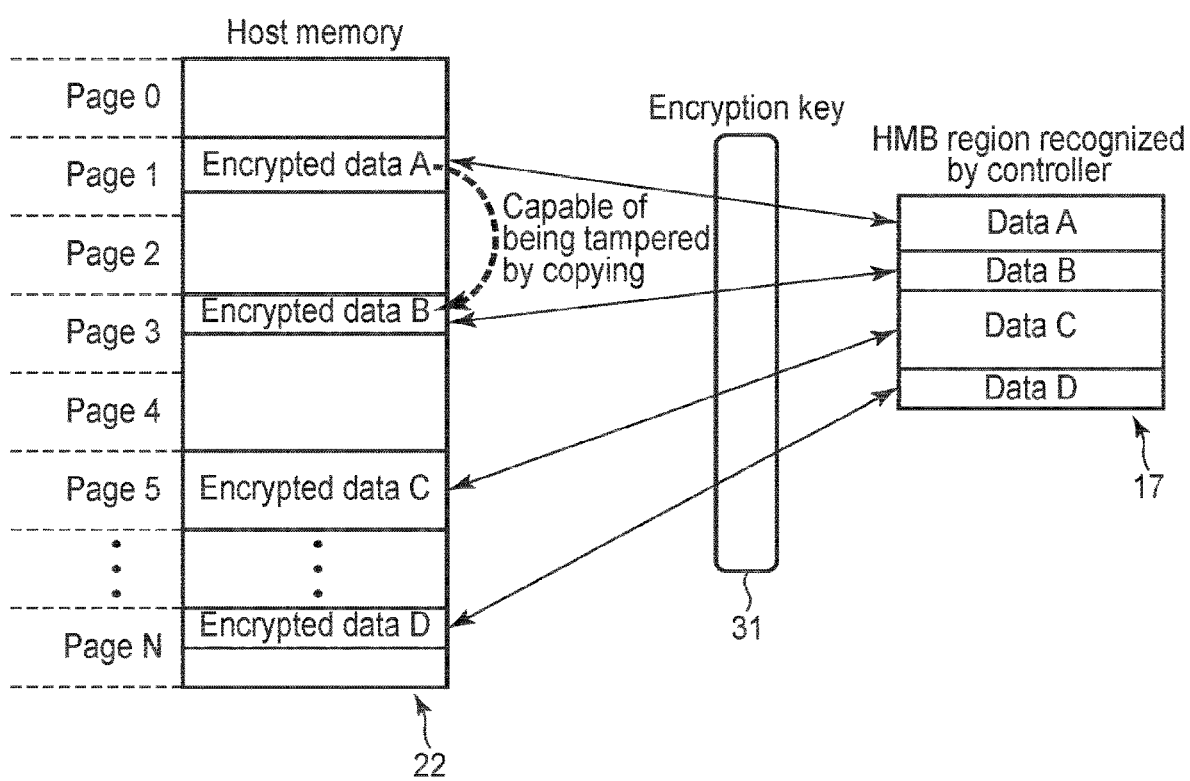

FIG. 13 illustrates an example in which data stored in the HMB 221 is tampered with when a single encryption key 31 is used for the entire HMB 221. Data stored in the HMB 221 in a host memory 22 is encrypted with the encryption key 31. When data A, B, C, and D are stored in HMB regions 17 recognized by the controller 4 of the SSD 3, the encrypted data A, B, C, and D are stored in the HMB 221 in the host memory 22. In other words, each of the data A, B, C, and D is encrypted by an encryption circuit 16 in which the encryption key 31 is set, and then stored in the host memory 22.

When the encrypted data A, B, C, and D are encrypted with the single encryption key 31, and when tampering of copying the encrypted data written in a region of the management unit (for example, an MPS region) to a region of the management unit in which the other encrypted data is written is executed, the controller 4 cannot detect the tampering.

More specifically, for example, a case where the encrypted data A, which is written in a page 1, is copied to a page 3 in which the encrypted data B is written will be described. In this case, both the encrypted data A and the encrypted data B are encrypted with the encryption key 31. For this reason, even when the encrypted data A includes data for error detection such as an error-correcting code (ECC) or error detection code (CRC), the controller 4 does not detect any error in the encrypted data A. In other words, the controller 4 cannot detect the tampering since the controller 4 can correctly decrypt the encrypted data A read from the page 3 with the encryption circuit 16 in which the encryption key 31 is set.

Figure 14A:
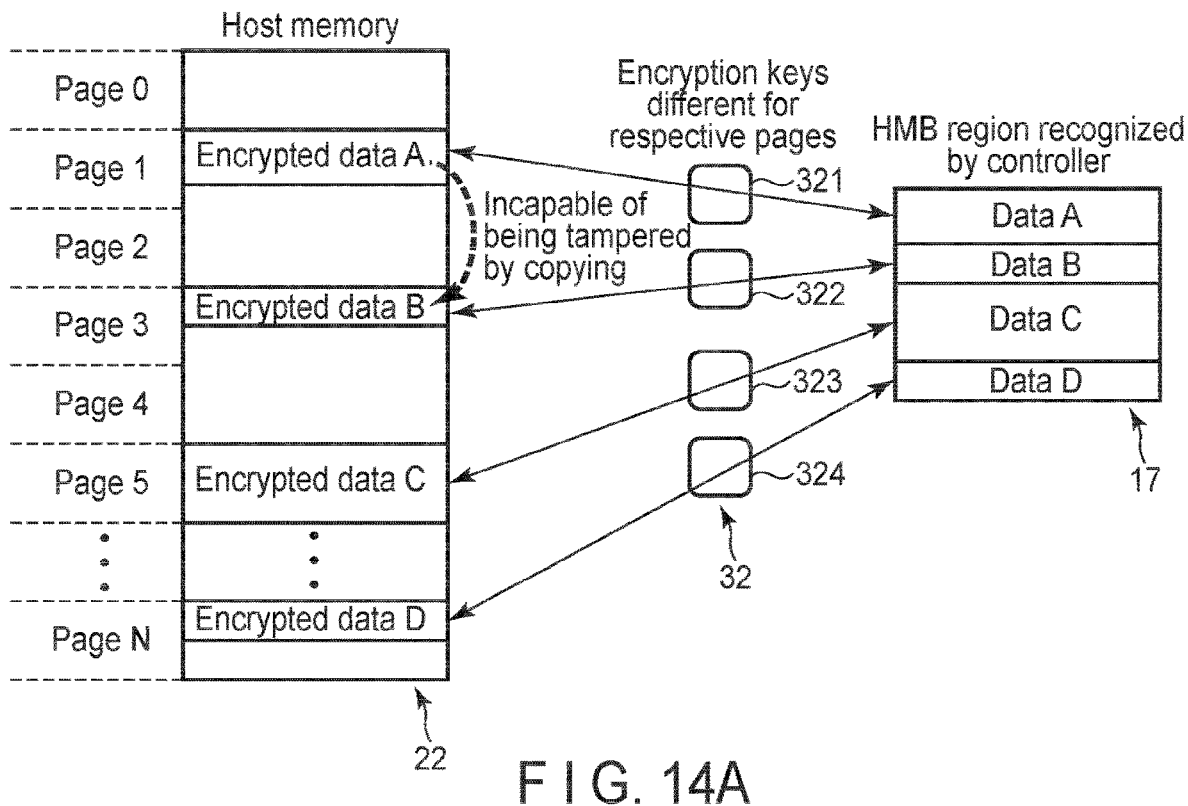
FIG. 14A is a diagram illustrating an example in which data to be stored in the host memory is encrypted by a memory system according to a second embodiment.

For this reason, in the present embodiment, as illustrated in FIG. 14A, different encryption keys 32 are used for regions in the management units in the HMB 221, respectively. The controller 4 uses the encryption keys 32 that are associated with the regions in the management units, respectively, for encrypting data to be written into each of the regions. The controller 4 uses the encryption keys 32 that are associated with the regions in the management units, respectively, for decrypting encrypted data read from each of the regions. For example, when a page 1, a page 3, a page 5, and a page N, which are regions in the management units (in this example, MPS regions) in the host memory 22, are used as the HMB 221, encryption keys 321, 322, 323, and 324 are used for the page 1, the page 3, the page 5, and the page N, respectively.

Data to be stored in the HMB 221 in the host memory 22 is encrypted with an encryption key that is associated with a region to which the data is to be written. When the data A, B, C, and D are stored in the HMB regions 17 recognized by the controller 4, the encrypted data A, B, C, and D encrypted with the encryption keys 321, 322, 323, and 324, respectively, are stored in the page 1, the page 3, the page 5, and the page N in the host memory 22. In other words, each of the data A, B, C, and D is encrypted by the encryption circuit 16 in which one of the encryption keys 321, 322, 323, and 324 corresponding to the region in which the data is to be written is set. Then, the encrypted data is stored to the host memory 22.

More specifically, when the controller 4 writes, for example, the data A into the page 1 of the accessible pages (i.e., regions in the management units), the controller 4 encrypts the data A with the encryption key 321 associated with the page 1 and writes the encrypted data A into the page 1. When the controller 4 writes the data B to the page 3, the controller 4 encrypts the data B with the encryption key 322 associated with the page 3 and writes the encrypted data B into the page 3. The data C and the data D are written into the page 5 and the page N, respectively, in the same manner.

Furthermore, for example, when the controller 4 reads data from the page 1 of the accessible pages, the controller 4 reads the encrypted data A from the page 1 and decrypts the encrypted data A with the encryption key 321 associated with the page 1. When the controller 4 reads data from the page 3, the controller 4 reads the encrypted data B from the page 3 and decrypts the encrypted data B with the encryption key 322 associated with the page 3. Data is read from page 5 and page N in the same manner.

Figure 14B:
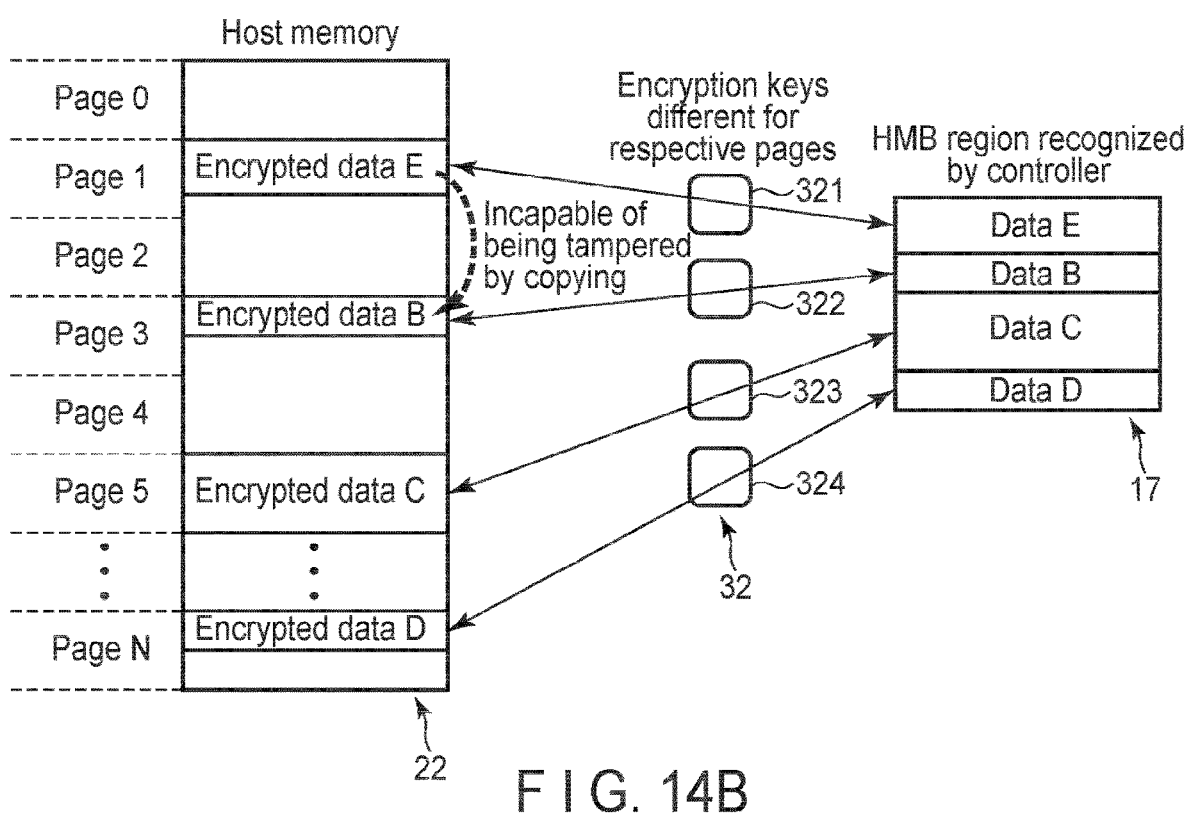
FIG. 14B is a diagram illustrating another example in which data to be stored in the host memory is encrypted by the memory system of the second embodiment.

In addition, as illustrated in FIG. 14B, when the controller 4 writes the data A into the page 1 and then writes the other data E into the page 1, the controller 4 encrypts the data E with the encryption key 321 associated with the page 1 and writes the encrypted data E to the page 1. When the controller 4 reads data from the page 1, the controller 4 reads the encrypted data E from the page 1 and decrypts the encrypted data E with the encryption key 321 associated with the page 1.

As a result, for example, when tampering of copying the encrypted data A stored in the page 1 to the page 3 in which the encrypted data B is stored, occurs, the controller 4 can determine that the encrypted data A read from the page 3 is tampered data. This is because the encryption key 321 used for encryption of the encrypted data A is different from the encryption key 322 used for encryption of the encrypted data B. When the controller 4 decrypts the encrypted data A with the encryption key 322, the controller 4 can determine that the encrypted data A is not correctly decrypted by using a CRC or the like.

Figure 15:
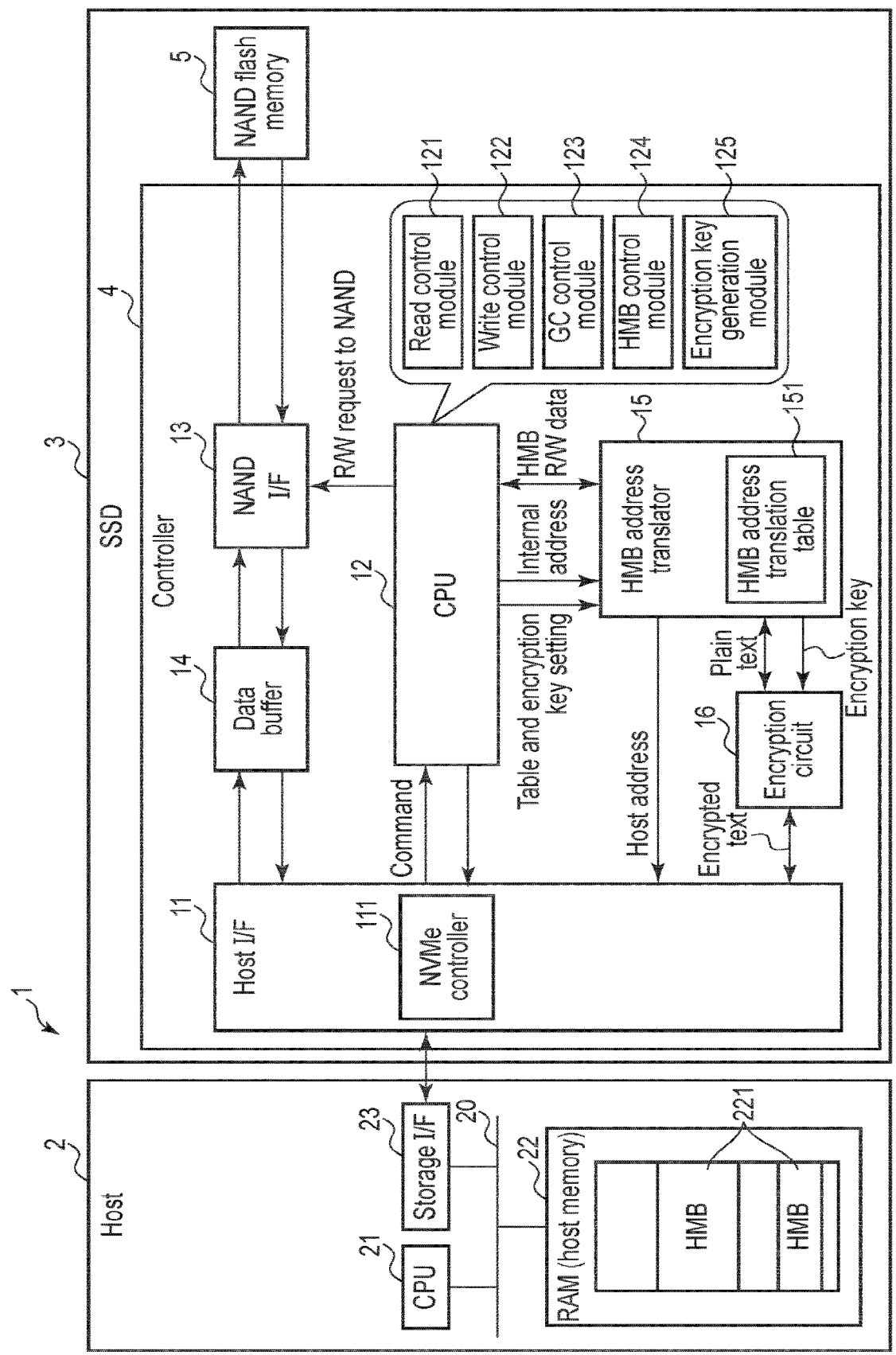
FIG. 15 is a block diagram illustrating a configuration example of an information processing system including the memory system of the second embodiment.

FIG. 15 illustrates a configuration example of the SSD 3 of the present embodiment. The encryption key generation module 125 of the CPU 12 generates an encryption key 32 for each of the regions in the management units included in the HMB 221. The encryption key generation module 125 sends the generated encryption key 32 to the HMB address translator 15.

The HMB address translator 15 updates the HMB address translation table 151 with the encryption key 32. More specifically, the HMB address translator 15 adds the encryption key 32 for a region of the management unit to the entry in the HMB address translation table 151 that corresponds to the region.

FIG. 16 illustrates a configuration example of the HMB address translation table 151. This HMB address translation table 151 further includes an encryption key field in comparison with the HMB address translation table 151 of the first embodiment described above with reference to FIG. 8.

In an entry corresponding to a region of the management unit, the encryption key field indicates the encryption key 32 associated with the region. That is, the encryption key field indicates the encryption key 32 set in the encryption circuit 16 when there is data to be written into the region and when there is data to be read from the region. In the example illustrated in FIG. 16, different encryption keys 32 (in this example, key A, key B, . . . , key F) are set in the encryption key fields, which are included in entries corresponding to the regions in the management units, respectively.

When the HMB address translator 15 receives an internal address to which data is to be written or an internal address from which data is to be read, from the HMB control module 124 of the CPU 12, the HMB address translator 15 specifies the entry in the HMB address translation table 151, which corresponds to the internal address. Then, the HMB address translator 15 sets the encryption key 32 included in the specified entry, in the encryption circuit 16.

The setting will be described in more detail with reference to the example illustrated in FIG. 14A.

For example, when the HMB control module 124 writes the data A to a first internal address of the HMB regions 17, the HMB address translator 15 determines a first host address corresponding to the first internal address with the HMB address translation table 151. The HMB address translator 15 determines the page 1 that is the region of the management unit and corresponds to the first host address. Then, the HMB address translator 15 sets the encryption key 321 associated with the page 1, in the encryption circuit 16.

The encryption circuit 16 encrypts the data A with the set encryption key 321. Then, the HMB address translator 15 transmits the first host address to the host 2 via the host I/F 11, the encryption circuit 16 transmits the encrypted data A to the host 2 via the host I/F 11, and the encrypted data A is thereby written into the page 1 corresponding to the first host address.

Furthermore, when the HMB control module 124 reads data from the first internal address of the HMB regions 17 after the encrypted data A is written in the page 1, the HMB address translator 15 determines the first host address corresponding to the first internal address with the HMB address translation table 151. The HMB address translator 15 determines the page 1 corresponding to the first host address. Then, the HMB address translator 15 sets the encryption key 321 associated with the page 1, in the encryption circuit 16.

The HMB address translator 15 transmits the first host address to the host 2 via the host I/F 11, and the encrypted data A is thereby read from the page 1 corresponding to the first host address. The encryption circuit 16 decrypts the encrypted data A with the set encryption key 321.

The above-described configuration in the controller 4 realizes writing the data A to the first internal address of the HMB regions 17 and reading the data A from the first internal address.

In addition, for example, when the HMB control module 124 writes the data B to a second internal address of the HMB regions 17, the HMB address translator 15 determines a second host address corresponding to the second internal address with the HMB address translation table 151. The HMB address translator 15 determines the page 3 that is the region of the management unit and corresponds to the second host address. Then, the HMB address translator 15 sets the encryption key 322 associated with the page 3, in the encryption circuit 16.

The encryption circuit 16 encrypts the data B with the set encryption key 322. Then, the HMB address translator 15 transmits the second host address to the host 2 via the host I/F 11, the encryption circuit 16 transmits the encrypted data B to the host 2 via the host I/F 11, and the encrypted data B is thereby written into the page 3 corresponding to the second host address.

Furthermore, when the HMB control module 124 reads the data from the second internal address of the HMB regions 17 after the encrypted data B is written to the page 3, the HMB address translator 15 determines the second host address corresponding to the second internal address with the HMB address translation table 151. The HMB address translator 15 determines the page 3 corresponding to the second host address. Then, the HMB address translator 15 sets the encryption key 322 associated with the page 3, in the encryption circuit 16.

The HMB address translator 15 transmits the second host address to the host 2 via the host I/F 11, and the encrypted data B is thereby read from the page 3 corresponding to the second host address. The encryption circuit 16 decrypts the encrypted data B with the set encryption key 322.

The above-described configuration in the controller 4 realizes writing the data B to the second internal address of the HMB regions 17 and reading the data B from the second internal address.

Writing the data C and the data D to the HMB regions 17, and reading the data C and the data D from the HMB regions 17 are performed in the same manner.

Thus, the encryption circuit 16 can use the encryption key 32 for each of the regions in the management units in the HMB 221 for encrypting data to be written into the region and decrypting encrypted data read from the region. Therefore, the SSD 3 can encrypt data to be stored in the external HMB 221 with the encryption key 32 for each of the regions in the management units.

For this reason, for example, even when tampering of copying encrypted data written in a region, to another region occurs, the controller 4 can detect the tampering when decrypting the read encrypted data since the different encryption keys 32 are used for the respective regions. Therefore, an erroneous operation of the SSD 3 or the like caused by the tampering does not occur, and the security can be improved.

A flowchart of FIG. 17 illustrates an example of the procedure of an HMB setting process performed by the controller 4. The procedure of step S41 and step S42 in the HMB setting process is the same as the procedure of step S11 and step S12 of the HMB setting process described above with reference to FIG. 9.

After the HMB address translation table 151 is generated in step S42, the controller 4 generates the encryption key 32 for each of the regions in the management units (step S43). Then, the controller 4 adds the generated encryption keys 32 for the respective regions to the HMB address translation table 151 (step S44). The controller 4 adds the encryption key 32 for each of the regions to the entry in the HMB address translation table 151 that corresponds to the region.

By performing the HMB setting process, the controller 4 can generate the HMB address translation table 151 including the encryption key 32 for each of the regions in the management units.

A flowchart of FIG. 18 illustrates an example of the procedure of an HMB addition process performed by the controller 4. The procedure of step S111 and step S112 in the HMB addition process is the same as the procedure of step S101 and step S102 of the HMB addition process described above with reference to FIG. 10.

After one or more entries each including address translation information are added to the HMB address translation table 151 in step S112, the controller 4 generates an encryption key 32 for each of the regions in the management units that correspond to the added address translation information in the entries (step S113). Then, the controller 4 adds the generated encryption key 32 for each of the regions to the HMB address translation table 151 (step S114). The controller 4 adds the encryption key 32 for each of the regions to the entry in the HMB address translation table 151 that corresponds to the region.

By performing the HMB addition process, the entries each including the address translation information corresponding to the respective regions added to the HMB 22 can be added to the HMB address translation table 151. Furthermore, the encryption key 32 corresponding to each of the added regions in the management units can be added to the HMB address translation table 151.

A flowchart of FIG. 19 illustrates an example of the procedure of an HMB write process performed by the controller 4. The procedure of step S51 in the HMB write process is the same as the procedure of step S21 of the HMB write process described above with reference to FIG. 11.

After an internal address to which data is to be written is determined in step S51, the controller 4 acquires the host address and the encryption key 32 that correspond to the internal address, with the HMB address translation table 151 (step S52). Then, the controller 4 sets the acquired encryption key 32 in the encryption circuit 16 (step S53). The data can be thereby encrypted with the encryption key 32 corresponding to the region to which the data is to be written.

The subsequent procedure of step S54 and step S55 is the same as the procedure of step S23 and step S24 of the HMB write process described above with reference to FIG. 11.

A flowchart of FIG. 20 illustrates an example of the procedure of an HMB read process performed by the controller 4. The procedure of step S61 in the HMB read process is the same as the procedure of step S31 of the HMB read process described above with reference to FIG. 12.

After an internal address from which data is to be read is determined in step S61, the controller 4 acquires the host address and the encryption key 32 that correspond to the internal address, with the HMB address translation table 151 (step S62). Then, the controller 4 sets the acquired encryption key 32 in the encryption circuit 16 (step S63). The data can be thereby decrypted with the encryption key 32 corresponding to the region from which the data is to be read.

The subsequent procedure from step S64 to step S66 is the same as the procedure from step S33 to step S35 of the HMB read process described above with reference to FIG. 12.

As described above, since the SSD 3 stores data encrypted with the encryption keys 32 of the respective regions in the management units in the HMB 221, the security in use of the HMB 221 can be improved.

Third Embodiment

In the first embodiment, the single encryption key 31 is used for writing encrypted data into the HMB 221 and decrypting encrypted data read from the HMB 221. In the second embodiment, the multiple encryption keys 32 different in each of the regions in the management units in the HMB 221 are used for writing encrypted data into the HMB 221 and decrypting encrypted data read from the HMB 221. In contrast, in a third embodiment, every time a data write operation is to be performed on any one of regions in the management units in the HMB 221, an encryption key is generated (or updated). The generated (or updated) encryption key is used for writing encrypted data into the HMB 221 and decrypting the encrypted data read from the HMB 221.

The configuration of an SSD 3 according to the third embodiment is similar to the SSD 3 of the first and second embodiments, and the third embodiment is different from the first and second embodiments with respect to only the procedure of processes executed by a configuration for generating an initial value for an encryption key (corresponding to an initial value generation module 126 illustrated in FIG. 23 to be described later), which is provided instead of the encryption key generation module 125 of the first and second embodiments, and the HMB address translator 15. Only the points different from the first and second embodiments will be explained below.

Figure 21:
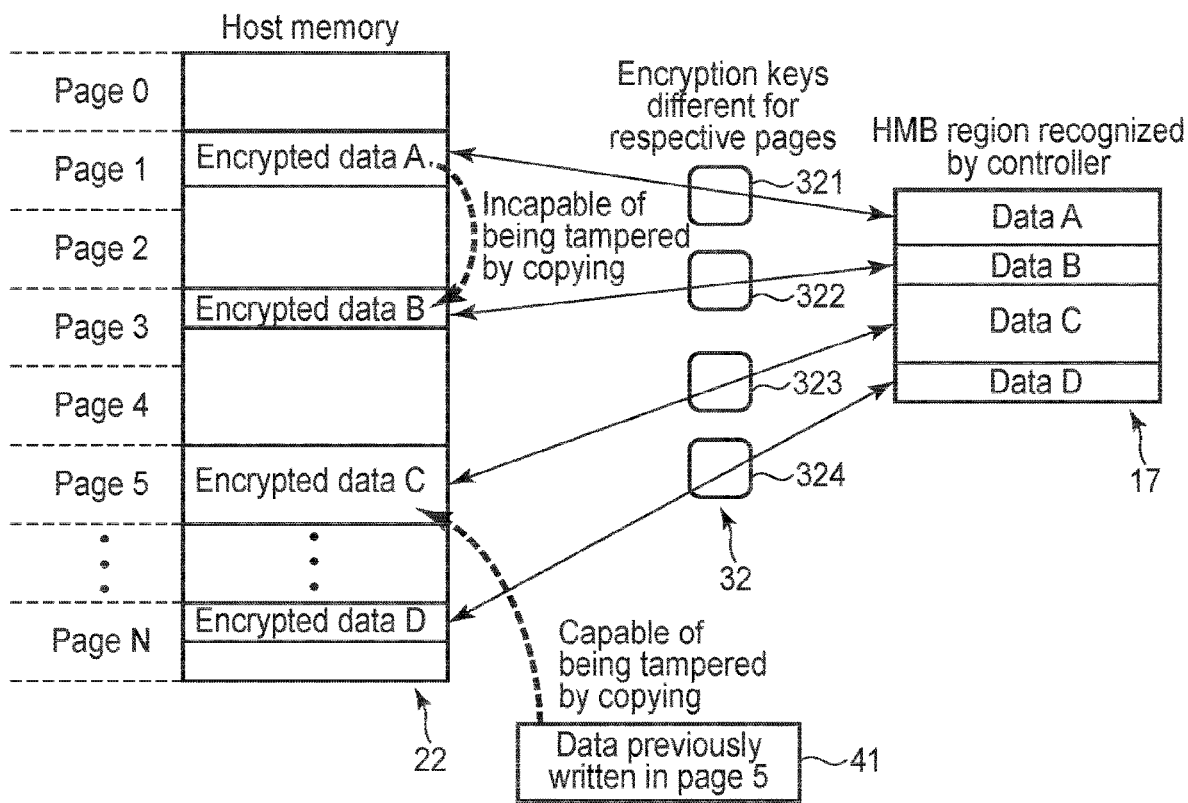

FIG. 21 illustrates an example in which data stored in the HMB 221 is tampered with when encryption keys 32 different in the respective regions in the management units in the HMB 221 are used. For example, when a page 1, a page 3, a page 5, and a page N in the management units (in this example, in MPS units) in the host memory 22 are used as the HMB 221, encryption keys 321, 322, 323, and 324 are used for the page 1, the page 3, the page 5, and the page N, respectively.

When encrypted data A, B, C, and D are obtained from encryption with the encryption keys 321, 322, 323, and 324 each corresponding to the region of the management units in which the data is written, and if previous data, which was written in a region, is copied to the region in which current data is written, for tampering with the current data, the controller 4 cannot detect the tampering.

More specifically, for example, a case where data 41, which was previously written in the page 5, is copied to the page 5 in which the encrypted data C is written will be described. Both the encrypted data C and the data 41 are obtained from encryption with the encryption key 323. For this reason, even when the data 41 includes information for detecting an error such as a CRC, the controller 4 does not detect any error in the data 41. In other words, the controller 4 cannot detect the tampering since the controller 4 can correctly decrypt the data 41 read from the page 5 with the encryption circuit 16 in which the encryption key 323 is set.

Figure 22A:
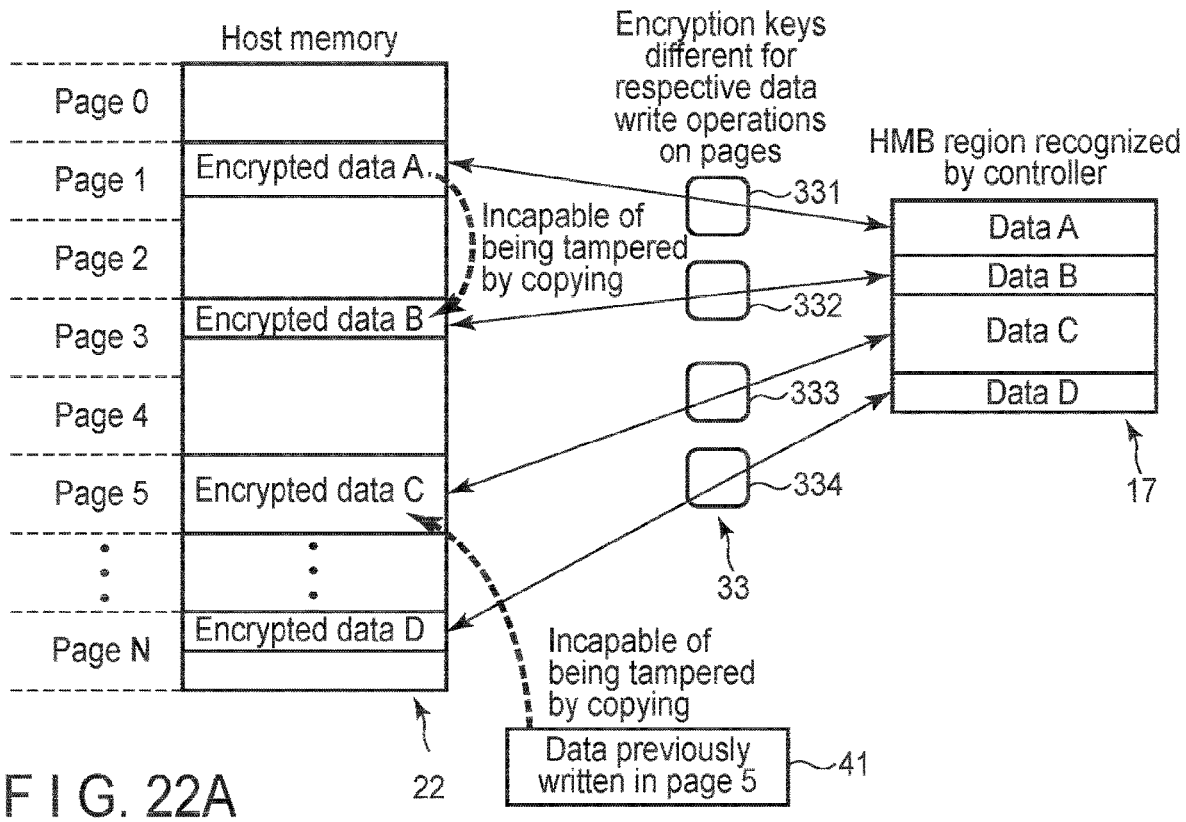
FIG. 22A is a diagram illustrating an example in which data to be stored in the host memory is encrypted by a memory system according to a third embodiment.

For this reason, in the present embodiment, as illustrated in FIG. 22A, an encryption key 33 generated every time data is to be written into any of regions in the management units in the HMB 221, is used. The controller 4 uses the encryption key 33, which is generated every time data is to be written into any of the regions in the management units, for encrypting the data to be written into the region and decrypting the encrypted data read from the region. For example, when a page 1, a page 3, a page 5, and a page N, which are regions in the management units (in this example, in MPS units) in the host memory 22, are used as the HMB 221, an encryption key 331, 332, 333, or 334 generated every time data is to be written into any of the page 1, the page 3, the page 5, and page N, is used. For this reason, the encryption key used for encryption of encrypted data previously written in a region is different from the encryption key used for encryption of the encrypted data that is to be newly written into the region.

Therefore, data to be stored in a region of the management unit in the HMB 221 is encrypted with an encryption key 33 corresponding to the data. When the data A, B, C, and D are stored in the HMB regions 17 recognized by the controller 4, the encrypted data A, B, C, and D encrypted with encryption keys 331, 332, 333, and 334, respectively, are stored in the page 1, the page 3, the page 5, and the page N in the host memory 22, respectively. In other words, each of the data A, B, C, and D is encrypted by the encryption circuit 16 in which the encryption key 331, 332, 333, or 334 generated for a write operation of the data to be performed is set, and then stored in the host memory 22.

More specifically, when the controller 4 writes the data A to the page 1 of the accessible pages (i.e., regions in the management units), the controller 4 generates the encryption key 331, encrypts the data A with the encryption key 331, and writes the encrypted data A into the page 1. The controller 4 may store the encryption key 331 or the information used for generation of the encryption key 331, which is associated with the page 1.

When the controller 4 writes the data B to the page 3, the controller 4 generates the encryption key 332, encrypts the data B with the encryption key 322, and writes the encrypted data B into the page 3. The controller 4 may store the encryption key 332 or the information used for generation of the encryption key 332, which is associated with the page 3.

The data C and the data D are written into the page 5 and the page N, respectively, in the same manner.

When the controller 4 reads data from the page 1 of the accessible pages, the controller 4 reads the encrypted data A from the page 1. Then, the controller 4 decrypts the encrypted data A with the stored encryption key 331 that is associated with the page 1. Alternatively, the controller 4 acquires the stored information for generating the encryption key 331 that associated with the page 1, generates the encryption key 331 with the information, and decrypts the encrypted data A with the encryption key 331.

When the controller 4 reads data from the page 3, the controller 4 reads the encrypted data B from the page 3. Then, the controller 4 decrypts the encrypted data B with the stored encryption key 332 that is associated with the page 3. Alternatively, the controller 4 acquires the stored information for generating the encryption key 332 that is associated with the page 3, generates the encryption key 332 with the information, and decrypts the encrypted data B with the encryption key 332.

The controller can read from the page 5 and the page N in the same manner.

Figure 22B:
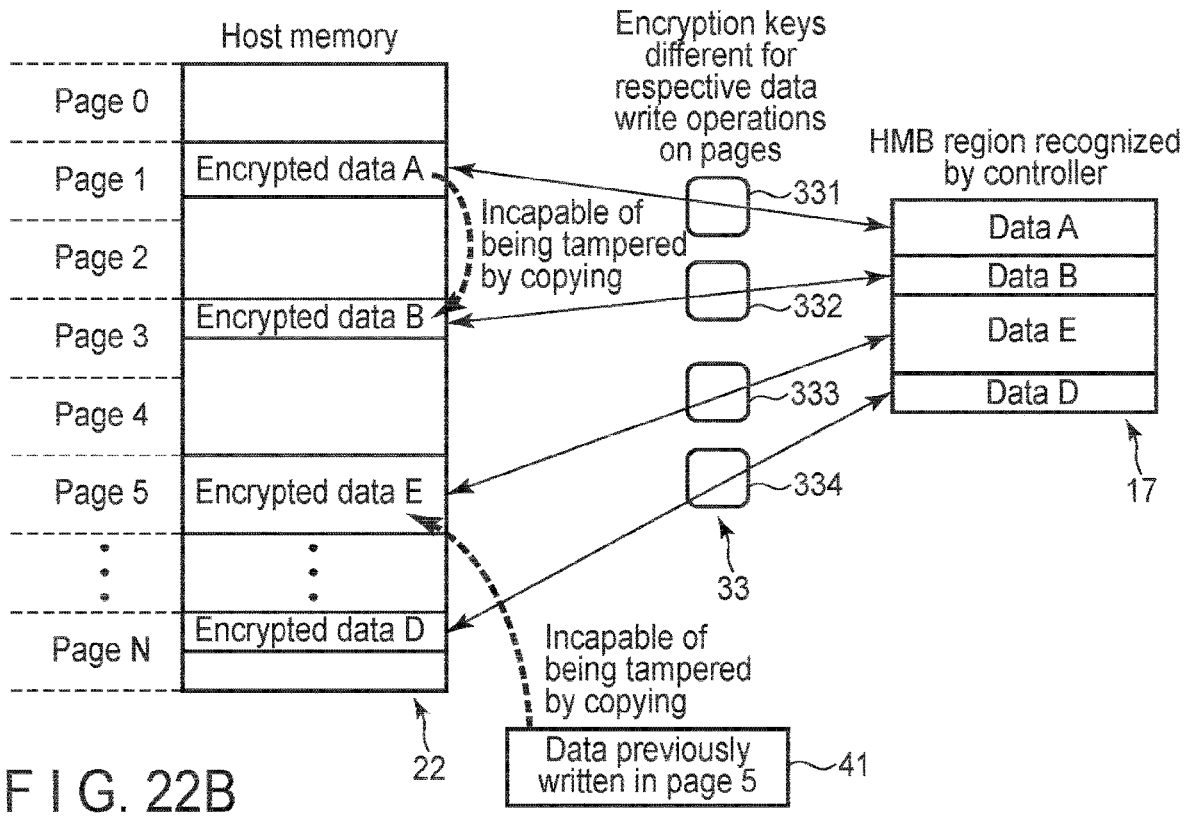
FIG. 22B is a diagram illustrating another example in which data to be stored in the host memory is encrypted by the memory system of the third embodiment.

In addition, as illustrated in FIG. 22B, when writing the data E to the page 5 after writing the data C to the page 5, the controller 4 generates a new encryption key 335, encrypts the data E with the new encryption key 335, and writes the encrypted data E to the page 5. The controller 4 may store the encryption key 335 or the information used for generation of the encryption key 335, which is associated with the page 5.

When the controller 4 reads data from the page 5, the controller 4 reads the encrypted data E from the page 5. Then, the controller 4 decrypts the encrypted data E with the stored encryption key 335 that is associated with the page 5. Alternatively, the controller 4 acquires the stored information for generating the encryption key 335 that is associated with the page 5, generates the encryption key 335 with the information, and decrypts the encrypted data E with the encryption key 335.

As a result, for example, when data 41 (for example, the encrypted data C) previously stored in the page 5 is copied to the page 5 in which the encrypted data E is currently stored, the controller 4 can determine the data 41 read from the page 5 as the tampered data. This is because the encryption key 335 used for encryption of the encrypted data E is different from the encryption key used for encryption of the data 41 (for example, the encryption key 333 used for encryption of the encrypted data C). When the controller 4 decrypts the data 41 with the encryption key 335, the controller 4 can determine that the data 41 is not correctly decrypted by using the CRC or the like.

FIG. 23 illustrates a configuration example of the SSD 3 of the present embodiment. An initial value generation module 126 of the CPU 12 generates an initial value (seed) for generation of an encryption key 33. The initial value generation module 126 generates initial values that are associated with regions in the management units (for example, MPS regions) in the HMB 221, respectively. The generated initial values are values unique to the respective regions in the management units. The initial value generation module 126 sends the generated initial values to the HMB address translator 15.

The HMB address translator 15 updates the HMB address translation table 151 with the initial values of the encryption keys 33. More specifically, the HMB address translator 15 adds an initial value of an encryption key 33, which is associated with a region of the management unit, to the entry in the HMB address translation table 151 that corresponds to the region.

The HMB address translator 15 includes an encryption key generation unit 152 that generates an encryption key 33. When data to be written to any of the regions in the management units is present, the encryption key generation unit 152 generates an encryption key 33. The encryption key generation unit 152 generates the encryption key 33 by using, for example, the initial value generated by the initial value generation module 126, which is associated with the region, and the number of times data is written into the region.

FIG. 24 illustrates a configuration example of the HMB address translation table 151. This HMB address translation table 151 further includes an initial value field and a write count field in comparison with the HMB address translation table 151 of the first embodiment described above with reference to FIG. 8.

In an entry corresponding to a region of the management unit, the initial value field indicates the initial value of the encryption key 33 corresponding to the region. That is, the initial value field indicates the initial value for the encryption key 33 which is generated when data to be written into the region is present and when data to be read from the region is present. The generated encryption key 33 is set in the encryption circuit 16. In the example illustrated in FIG. 24, different initial values (in this example, seed A, seed B, . . . , seed F) are set in the respective initial value fields, in entries corresponding to the regions in the management units.

The write count field indicates the number of times data is written into the corresponding region. When an entry is added to the HMB address translation table 151, for example, zero is set in the write count field in the entry. Then, every time data is to be written into the region corresponding to the entry, i.e., every time the HMB control module 124 of the CPU 12 requests an data write operation to the region, one is added to the value set in the write count field.

When the HMB address translator 15 receives an internal address to which data is to be written, from the HMB control module 124 of the CPU 12, the HMB address translator 15 specifies the entry in the HMB address translation table 151, which corresponds to the internal address. Then, the HMB address translator 15 adds one to the write count included in the specified entry.

In addition, when the HMB address translator 15 receives an internal address from which data is to be read, from the HMB control module 124 of the CPU 12, the HMB address translator 15 specifies the entry in the HMB address translation table 151, which corresponds to the internal address.

The encryption key generation unit 152 generates the encryption key 32 on the basis of the initial value and the write count in the specified entry. Then, the encryption key generation unit 152 sets the generated encryption key 33 in the encryption circuit 16.

The setting will be described in more detail with reference to the example illustrated in FIG. 22A.

When the HMB control module 124 writes the data C to a third internal address of the HMB regions 17, the HMB address translator 15 determines a third host address corresponding to the third internal address with the HMB address translation table 151. The HMB address translator 15 determines the page 5 that is the region of the management unit and corresponds to the third host address.

The HMB address translator 15 generates the encryption key 333 with the initial value associated with the page 5 and the number of times data is written into the page 5. Then, the HMB address translator 15 sets the encryption key 333 in the encryption circuit 16.

The encryption circuit 16 encrypts the data C with the set encryption key 333. Then, the HMB address translator 15 transmits the third host address to the host 2 via the host I/F 11, the encryption circuit 16 transmits the encrypted data C to the host 2 via the host I/F 11, and the encrypted data C is thereby written into the page 5 corresponding to the third host address.

When the HMB control module 124 reads data from the third internal address after the encrypted data C is written into the page 5, the HMB address translator 15 determines the third host address corresponding to the third internal address with the HMB address translation table 151. The HMB address translator 15 determines the page 5 corresponding to the third host address.

The HMB address translator 15 generates the encryption key 333 with the initial value associated with the page 5 and the number of times data is written into the page 5. Then, the HMB address translator 15 sets the encryption key 333 in the encryption circuit 16.

The HMB address translator 15 transmits the third host address to the host 2 via the host I/F 11 and the encrypted data C is thereby read from the page 5 corresponding to the third host address. The encryption circuit 16 decrypts the encrypted data C with the set encryption key 333.

The above-described configuration in the controller 4 realizes writing the data C into the third internal address of the HMB regions 17 and reading the data C from the third internal address.

Furthermore, when the HMB control module 124 writes the other data E to the third internal address after the encrypted data C is written into the page 5, the HMB address translator 15 determines the third host address corresponding to the third internal address with the HMB address translation table 151. The HMB address translator 15 determines the page 5 corresponding to the third host address.

The HMB address translator 15 generates a new encryption key 335 with the initial value associated with the page 5 and the number of times data is written to the page 5. Then, the HMB address translator 15 sets the encryption key 335 in the encryption circuit 16.

The encryption circuit 16 encrypts the data E with the set encryption key 335. Then, the HMB address translator 15 transmits the third host address to the host 2 via the host I/F 11, the encryption circuit 16 transmits the encrypted data E to the host 2 via the host I/F 11, and the encrypted data E is thereby written into the page 5 corresponding to the third host address.

Furthermore, when the HMB control module 124 reads data from the third internal address after the encrypted data E is written into the page 5, the HMB address translator 15 determines the third host address corresponding to the third internal address with the HMB address translation table 151. The HMB address translator 15 determines the page 5 corresponding to the third host address.

The HMB address translator 15 generates the encryption key 335 with the initial value associated with the page 5 and the number of times data is written into the page 5. Then, the HMB address translator 15 sets the encryption key 335 in the encryption circuit 16.

The HMB address translator 15 transmits the third host address to the host 2 via the host I/F 11, and the encrypted data E is thereby read from the page 5 corresponding to the third host address. The encryption circuit 16 decrypts the encrypted data E with the set encryption key 335.

The above-described configuration in the controller 4 realizes writing the data E into the third internal address of the HMB regions 17 and reading the data E from the third internal address.

Thus, the controller 4 can the encryption key 33, which is generated every time data is written into any of the regions in the management units in the HMB 221, for encrypting data to be written into the region and decrypt encrypted data read from the regions.

Therefore, since the SSD 3 can encrypt data to be stored in the external HMB 221 with the encryption keys 33 of the respective data pieces stored in the regions in the management units, security can be improved.

For example, even when tampering of copying encrypted data, which is written in a region, to another region occurs, the controller 4 can detect the tampering when decrypting the encrypted data since the different encryption keys 33 are used for the respective data pieces. In addition, for example, even when tampering of copying encrypted data, which was previously written in a region, to the region occurs, the controller 4 can detect the tampering when decrypting the copied encrypted data since the different encryption keys 33 are used for the respective data pieces. Therefore, an erroneous operation of the SSD 3 or the like does not occur due to the tampering, and the security can be improved.

The encryption key generation unit 152 may be configured to generate a unique encryption key 33 every time data is to be written into any of the regions in the management units, i.e., every time the HMB control module 124 requests a data write operation to any of the regions in the management units, without using the initial value associated with the region of the management unit and the number of times data is written into the region. Since the encryption key generation unit 152 does not use the initial value, the CPU 12 may not function as the initial value generation module 126.

In this case, the HMB address translation table 151 may include the configuration illustrated in FIG. 16. The encryption key generation unit 152 updates the HMB address translation table 151 with the encryption key 33 every time the encryption key 33 is generated. That is, the encryption key generation unit 152 sets the generated encryption key 33 (i.e., the latest encryption key) in the encryption key field of the corresponding entry in the HMB address translation table 151. Thus, since the encryption key 33 in the HMB address translation table 151 is used for decryption of encrypted data read from the HMB 221, the encryption key 33 is not generated when the data is read.

A flowchart of FIG. 25 illustrates an example of the procedure of an HMB setting process performed by the controller 4. The procedure of step S71 and step S72 in the HMB setting process is the same as the procedure of step S11 and step S12 of the HMB setting process described above with reference to FIG. 9.

After the HMB address translation table 151 is generated in step S72, the controller 4 generates an initial value of an encryption key for the regions in the management units (step S73). Then, the controller 4 adds the generated initial value of the encryption key for each region to the HMB address translation table 151 (step S74). The controller 4 adds the initial value of the encryption key for each of the regions to the entry in the HMB address translation table 151 that corresponds to the region.

By performing the HMB setting process, the controller 4 can generate the HMB address translation table 151 including the initial value of the encryption key for each region of the management unit.

A flowchart of FIG. 26 illustrates an example of the procedure of an HMB addition process performed by the controller 4. The procedure of step S121 and step S122 in the HMB addition process is the same as the procedure of step S101 and step S102 of the HMB addition process described above with reference to FIG. 10.

After one or more entries each including address translation information are added to the HMB address translation table 151 in step S122, the controller 4 generates an initial value of an encryption key for each region of the management unit that corresponds to the added address translation information (step S123). Then, the controller 4 adds the generated initial values of the encryption keys for the respective regions to the HMB address translation table 151 (step S124). The controller 4 adds the initial value of the encryption key for each of the regions to the entry in the HMB address translation table 151 that corresponds to the region.

By performing HMB addition process, the entries each including the address translation information corresponding to the region added to the HMB 22 can be added to the HMB address translation table 151. In addition, the initial value of the encryption key corresponding to each of the regions in the management units can be added to the HMB address translation table 151.

Figure 27:
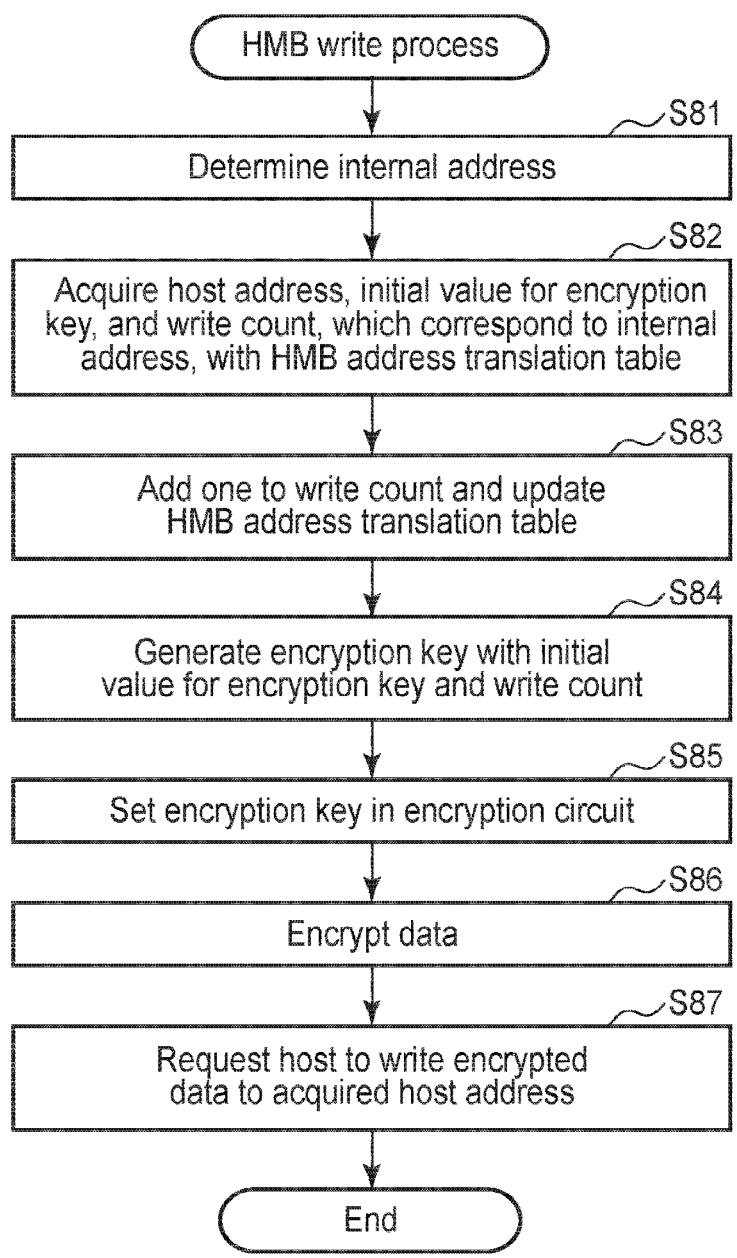
FIG. 27 is a flowchart illustrating an example of the procedure of an HMB write process executed in the memory system of the third embodiment.

A flowchart of FIG. 27 illustrates an example of the procedure of an HMB write process performed by the controller 4. The procedure of step S81 in the HMB write process is the same as the procedure of step S21 of the HMB write process described above with reference to FIG. 11.

After an internal address to which data is to be written is determined in step S81, the controller 4 acquires the host address, the initial value of the encryption key, and the write count that correspond to the internal address, with the HMB address translation table 151 (step S82). The controller 4 adds one to the acquired write count, and updates the HMB address translation table 151 with the write count to which one is added (step S83).

The controller 4 generates the encryption key 33 with the acquired initial value of the encryption key and the write count to which one is added (step S84). Then controller 4 sets the generated encryption key 33 in the encryption circuit 16 (step S85). Data can be thereby encrypted with the encryption key 33 that is generated every time data is to be written into the HMB 221.

The subsequent procedure of step S86 and step S87 is the same as the procedure of step S23 and step S24 of the HMB write process described above with reference to FIG. 11.

A flowchart of FIG. 28 illustrates an example of the procedure of an HMB read process performed by the controller 4. The procedure of step S91 in the HMB read process is the same as the procedure of step S31 of the HMB read process described above with reference to FIG. 12.

After an internal address from which data is to be read is determined in step S91, the controller 4 acquires the host address, the initial value of the encryption key, and the write count that correspond to the internal address, with the HMB address translation table 151 (step S92). The controller 4 generates the encryption key 33 with the acquired initial value of the encryption key and the acquired write count (step S93). Then, the controller 4 sets the generated encryption key 33 in the encryption circuit 16 (step S94). Read data can be thereby decrypted with the encryption key 33 corresponding to the data.

The subsequent procedure from step S95 to step S97 is the same as the procedure from step S33 to step S35 of the HMB read process described above with reference to FIG. 12.

Therefore, since the SSD 3 encrypts data with the encryption key 33 generated every time data is to be written to any of the regions in the management units and stores the encrypted data in the HMB 221, the security in use of the HMB 221 can be improved.

As described above, according to the first to third embodiments, the security in use of the HMB can be improved. The controller 4 controls the NAND flash memory 5, writes data to the host memory (RAM) 22 in the host 2, and reads data from the host memory 22. The host memory 22 includes regions in specific units (for example, MPS regions) to which the controller 4 is accessible. The controller 4 encrypts data to be written into each of the regions and decrypts data read from each of the regions, with the encryption keys 32 that are associated with the regions, respectively.

Thus, when data is to be written into a region of the specific unit in the HMB 221, the data is encrypted with the encryption key 32 corresponding to the region, and the security can be thereby improved. For example, even when tampering of copying encrypted data, which written in the other region, to this region, occurs, the controller 4 can detect the tampering when decrypting the encrypted data since the different encryption keys 32 are used for the respective regions. Therefore, an erroneous operation of the SSD 3 or the like does not occur due to the tampering, and the security can be improved.

Each of various functions described in the first to third embodiments may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiments may be realized in a processing circuit.

Since various processes of the embodiments can be realized by a computer program, the same advantages as those of the embodiments can easily be obtained simply by installing the computer program in a computer through a computer-readable storage medium in which the computer program is stored and by executing the computer program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a nonvolatile memory; and
a controller configured to:
control the nonvolatile memory;
write data to a random access memory in a host; and
read data from the random access memory, wherein
the random access memory comprises regions in first units to which the controller is accessible, and
the controller is configured to:
when writing first data into a first region of the regions, encrypt the first data with a first encryption key associated with the first region, and write the encrypted first data into the first region; and
when writing second data into a second region of the regions, encrypt the second data with a second encryption key that is associated with the second region and is different from the first encryption key, and write the encrypted second data into the second region.

2. The memory system of claim 1, wherein the controller is configured to:
when reading the encrypted first data from the first region, decrypt the encrypted first data with the first encryption key; and
when reading the encrypted second data from the second region, decrypt the encrypted second data with the second encryption key.

3. The memory system of claim 1, wherein the controller is configured to:
when writing third data into the first region after the encrypted first data is written into the first region, encrypt the third data with the first encryption key and write the encrypted third data into the first region; and
when reading the encrypted third data from the first region, decrypt the encrypted third data with the first encryption key.

4. The memory system of claim 1, wherein the controller is configured to:
when reading the encrypted first data from the first region, decrypt the encrypted first data with the first encryption key.

5. The memory system of claim 4, wherein the controller is further configured to:
when writing third data into the first region after the encrypted first data is written into the first region, generate a third encryption key that is different from the first encryption key, encrypt the third data with the third encryption key, and write the encrypted third data into the first region; and
when reading the encrypted third data from the first region, decrypt the encrypted third data with the third encryption key.

6. The memory system of claim 5, wherein the controller is configured to generate the first encryption key and the third encryption key, using a first value associated with the first region and a number of times data is written in the first region.

7. A memory system comprising:
a nonvolatile memory; and
a controller configured to:
control the nonvolatile memory;
write data to a random access memory in a host; and
read data from the random access memory, wherein
the random access memory comprises regions in first units to which the controller is accessible, and
the controller is configured to:
use encryption keys associated with the regions, respectively, for encrypting data to be written into each of the regions and decrypting data read from each of the regions
acquire region information indicative of the regions from the host; and
map the regions to a contiguous memory space by using the region information and generate address translation information indicative of relationship between a location in the regions and a location in the memory space.

8. The memory system of claim 7, wherein the controller is configured to:
when writing first data into a first address in the memory space, determine a first region of the regions that corresponds to the first address by using the address translation information, encrypt the first data with a first encryption key associated with the first region, and write the encrypted first data into the first region; and
when writing second data to a second address in the memory space, determine a second region of the regions that corresponds to the second address by using the address translation information, encrypt the second data with a second encryption key that is associated with the second region and is different from the first encryption key, and write the encrypted second data to the second region.

9. The memory system of claim 8, wherein the controller is configured to:
when reading data from the first address, determine the first region corresponding to the first address by using the address translation information, read the encrypted first data from the first region, and decrypt the encrypted first data with the first encryption key; and
when reading data from the second address, determine the second region corresponding to the second address by using the address translation information, read the encrypted second data from the second region, and decrypt the encrypted second data with the second encryption key.

10. The memory system of claim 7, wherein the controller is configured to:
when writing first data into a first address in the memory space, determine a first region of the regions that corresponds to the first address by using the address translation information, generate a first encryption key, encrypt the first data with the first encryption key, and write the encrypted first data into the first region; and
when reading data from the first address, determine the first region corresponding to the first address by using the address translation information, read the encrypted first data from the first region, and decrypt the encrypted first data with the first encryption key.

11. The memory system of claim 10, wherein the controller is further configured to:
when writing third data into the first address after the encrypted first data is written into the first region, determine the first region corresponding to the first address by using the address translation information, generate a third encryption key that is different from the first encryption key, encrypt the third data with the third encryption key, and write the encrypted third data into the first region; and
when reading data from the first address, determine the first region corresponding to the first address by using the address translation information, read the encrypted third data from the first region, and decrypt the encrypted third data with the third encryption key.

12. A memory system comprising:
a nonvolatile memory; and
a controller configured to:
  control the nonvolatile memory;
  write data to a random access memory in a host; and
  read data from the random access memory, wherein
the random access memory comprises regions in first units to which the controller is accessible,
the regions are included in dispersed regions in the random access memory, and
the controller is configured to use encryption keys associated with the regions, respectively, for encrypting data to be written into each of the regions and decrypting data read from each of the regions.

13. The memory system of claim 12, wherein the controller is configured to:
when writing first data into a first region of the regions, encrypt the first data with a first encryption key associated with the first region, and write the encrypted first data into the first region; and
when writing second data into a second region of the regions, encrypt the second data with a second encryption key that is associated with the second region and is different from the first encryption key, and write the encrypted second data into the second region.

14. The memory system of claim 13, wherein the controller is configured to:
when reading the encrypted first data from the first region, decrypt the encrypted first data with the first encryption key; and
when reading the encrypted second data from the second region, decrypt the encrypted second data with the second encryption key.

15. The memory system of claim 12, wherein the controller is configured to:
when writing first data into a first region of the regions, generate a first encryption key, encrypt the first data with the first encryption key, and write the encrypted first data into the first region; and
when reading the encrypted first data from the first region, decrypt the encrypted first data with the first encryption key.

16. The memory system of claim 15, wherein the controller is further configured to:
when writing third data into the first region after the encrypted first data is written into the first region, generate a third encryption key that is different from the first encryption key, encrypt the third data with the third encryption key, and write the encrypted third data into the first region; and
when reading the encrypted third data from the first region, decrypt the encrypted third data with the third encryption key.

17. The memory system of claim 16, wherein the controller is configured to generate the first encryption key and the third encryption key, using a first value associated with the first region and a number of times data is written in the first region.

18. The memory system of claim 12, wherein the controller is further configured to:
acquire region information indicative of the regions from the host; and
map the regions to a contiguous memory space by using the region information and generate address translation information indicative of relationship between a location in the regions and a location in the memory space.

19. The memory system of claim 18, wherein the controller is configured to:
when writing first data into a first address in the memory space, determine a first region of the regions that corresponds to the first address by using the address translation information, encrypt the first data with a first encryption key associated with the first region, and write the encrypted first data into the first region; and
when writing second data to a second address in the memory space, determine a second region of the regions that corresponds to the second address by using the address translation information, encrypt the second data with a second encryption key that is associated with the second region and is different from the first encryption key, and write the encrypted second data to the second region.

20. The memory system of claim 18, wherein the controller is configured to:
when writing first data into a first address in the memory space, determine a first region of the regions that corresponds to the first address by using the address translation information, generate a first encryption key, encrypt the first data with the first encryption key, and write the encrypted first data into the first region; and
when reading data from the first address, determine the first region corresponding to the first address by using the address translation information, read the encrypted first data from the first region, and decrypt the encrypted first data with the first encryption key.

\* \* \* \* \*